(12) United States Patent
Ishikawa et al.

(10) Patent No.: US 7,276,302 B2
(45) Date of Patent: Oct. 2, 2007

(54) MAGNETIC TAPE

(75) Inventors: Akira Ishikawa, Haga-Gun (JP);
Takashi Ishii, Yokohama (JP);
Mitsuhiro Katashima, Haga-Gun (JP);
Masato Hoshi, Haga-Gun (JP);
Takahisa Yamashiro, Haga-Gun (JP);
Shinsuke Okuda, Haga-Gun (JP); Koji Uchida, Haga-Gun (JP)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/675,796

(22) Filed: Sep. 29, 2003

(65) Prior Publication Data

US 2004/0258960 A1 Dec. 23, 2004

Related U.S. Application Data

(63) Continuation of application No. 09/975,343, filed on Oct. 11, 2001, now abandoned, which is a continuation of application No. 09/554,678, filed as application No. PCT/JP98/05183 on Nov. 18, 1998.

(30) Foreign Application Priority Data

Nov. 21, 1997 (JP) ................................. 9-337733
Jul. 6, 1998 (JP) ................................. 10-190867
Jul. 30, 1998 (JP) ................................. 10-215432

(51) Int. Cl.
*G11B 5/66* (2006.01)
*G11B 5/70* (2006.01)

(52) U.S. Cl. .................................................. 428/845.6

(58) Field of Classification Search ................ 428/167, 428/336, 409, 694 BB, 845.6
See application file for complete search history.

(56) References Cited

U.S. PATENT DOCUMENTS 5,462,823 A * 10/1995 Evans et al. .................. 430/14
5,589,247 A * 12/1996 Wallack et al. ............. 428/141

* cited by examiner

*Primary Examiner*—Holly Rickman
(74) *Attorney, Agent, or Firm*—Morrison & Foerster LLP

(57) ABSTRACT

A magnetic tape comprising a substrate having on one side thereof a magnetic layer serving as a recording surface and on the other side thereof a resin layer serving as a non-recording surface, wherein said magnetic tape has a region on the side of the non-recording surface along the longitudinal direction of the tape in which a regular pattern for servo tracking having different optical properties from the other major region of the side of the non-recording surface is to be formed, and said magnetic tape has a thickness of 7 µm or less.

1 Claim, 5 Drawing Sheets

Fig. 4(a)
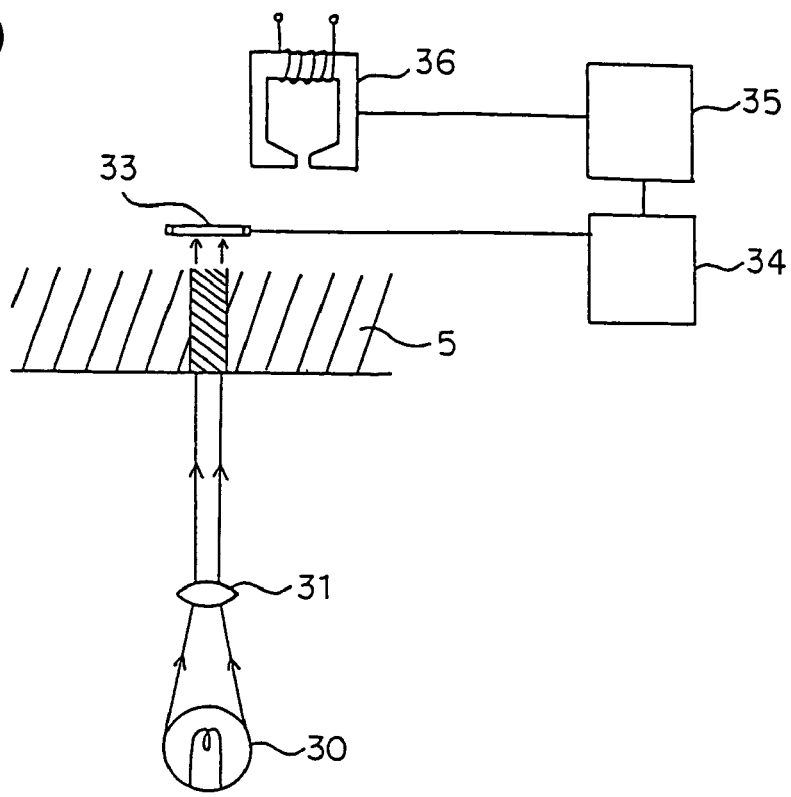
Fig. 4(b)  Fig. 4(c)  Fig. 4(d)
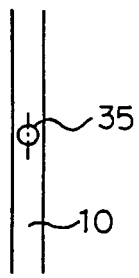
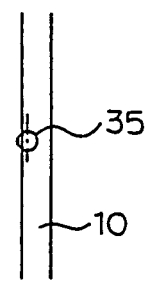
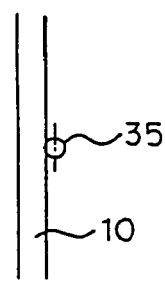
Fig. 5
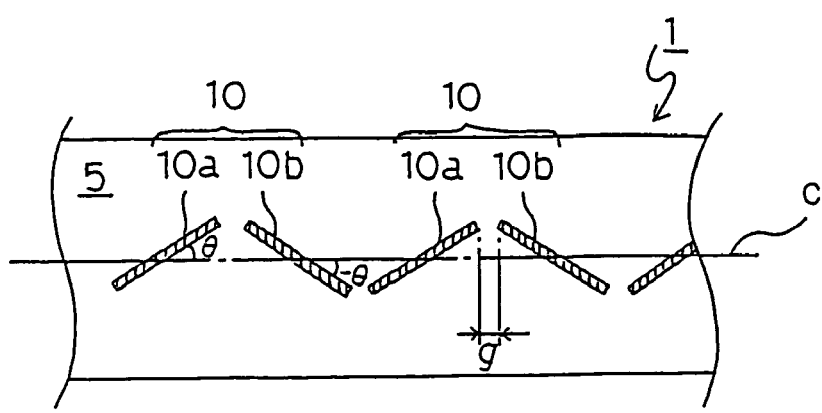

MAGNETIC TAPE

CROSS-REFERENCE TO RELATED APPLICATIONS

This application is a continuation application of patent application Ser. No. 09/975,343, filed on Oct. 11, 2001, now abandoned, which is a continuation application of patent application Ser. No. 09/554,678, filed on Jul. 17, 2000, which is a 371 of PCT/JP98/05183, filed on Nov. 18, 1998 which claims benefit of Japanese applications JAPAN 9-337733, filed Nov. 21, 1997, JAPAN 10-190867, filed Jul. 6, 1998, and JAPAN 10-215432, filed Jul. 30, 1998.

TECHNICAL FIELD

The present invention relates to magnetic tape capable of optically recording servo signals for tracking. More particularly, it relates to magnetic tape capable of optically recording servo signals for tracking on the side opposite to the magnetic recording side.

BACKGROUND ART

General magnetic tape has a low recording density because of its low track density. Serpentine type magnetic tape particularly has a low recording density. On the other hand, helical scan type magnetic tape, which uses a servo tracking system called automatic track finding (ATF), possesses a higher track density than the serpentine type magnetic tape.

Servo tracking systems proposed for serpentine type magnetic tape include an embedded servo system, in which servo signals are written on the same track as the data track on the magnetic recording surface, and a system in which a track exclusive to servo signals is provided on the magnetic recording surface. Japanese Patent Publication No. 82626/95 discloses a servo control system particularly useful where the pitch of data tracks is as small as several tens of microns, in which a dedicated track for servo information is provided on the magnetic recording surface and a plurality of servo reproduction heads are used for reading the servo signals. According to this technique, however, the number of serve reproduction heads must be increased as the number of tracks increases. Otherwise, the number of servo tracks should be increased. Like this, conventional servo tracking systems use the same side of magnetic tape as used by data recording, which means that the data recording area is reduced accordingly. This disadvantage is conspicuous in the servo tracking system of Japanese Patent Publn. No. 82626/95 when a track density is as high as about 30 tracks per mm or even more.

DISCLOSURE OF INVENTION

Accordingly, an object of the present invention is to provide a magnetic tape which furnishes information for servo tracking without lessening the data recording area.

Another object of the present invention is to provide a magnetic tape having an high track density.

Still another object of the present invention is to provide a magnetic tape which furnishes information for servo tracking while maintaining a high S/N ratio.

Yet another object of the present invention is to provide a magnetic tape having a high recording capacity.

The inventors of the present invention have found that the above objects are accomplished by a magnetic tape having formed on the side opposite to the magnetic recording side thereof a layer capable of optically recording servo signals for tracking.

Completed based on the above finding, the present invention provides a magnetic tape comprising a substrate having on one side thereof a magnetic layer serving as a recording surface and on the other side thereof a resin layer serving as a non-recording surface, wherein the magnetic tape has a region on the side of the non-recording surface along the longitudinal direction of the tape in which a regular pattern for servo tracking having different optical properties from the other major region of the side of the non-recording surface is to be formed, and the magnetic tape has a thickness of 7 µm or less.

The present invention also provides a magnetic tape comprising a substrate having on one side thereof a magnetic layer serving as a recording surface and on the other side thereof a resin layer serving as a non-recording surface, wherein said magnetic tape has a regular pattern for servo tracking on the side of the non-recording surface along the longitudinal direction of the tape which has different optical properties from the other major region of the side of the non-recording surface, and said magnetic tape has a thickness of 7 µm or less.

According to the present invention it is provided a magnetic tape which furnishes servo information without reducing the data area, a magnetic tape which furnishes information for servo tracking while maintaining a high S/N ratio, a magnetic tape which furnishes servo information without impairing the properties inherent to a backcoating layer, a magnetic tape having an increased track density, and a magnetic tape having a high recording capacity.

In particular, the present invention provides a magnetic tape having a metallic thin layer located between the substrate and a backcoating layer, which tape has high stiffness for its thickness as small as 7 µm or less and thereby easily achieves high recording capacity without involving reductions in running properties and durability.

BRIEF DESCRIPTION OF DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4(a), FIG. 4(b), FIG. 4(c) and FIG. 4(d) schematically illustrate a method for achieving servo control by push-pull method;

FIG. 5 shows another color-changed pattern (corresponding to FIG. 3);

BEST MODE FOR CARRYING OUT THE INVENTION

The magnetic tape of the present invention will be described in detail with reference to the preferred embodiments thereof depicted in the accompanying drawings.

Figure 1:
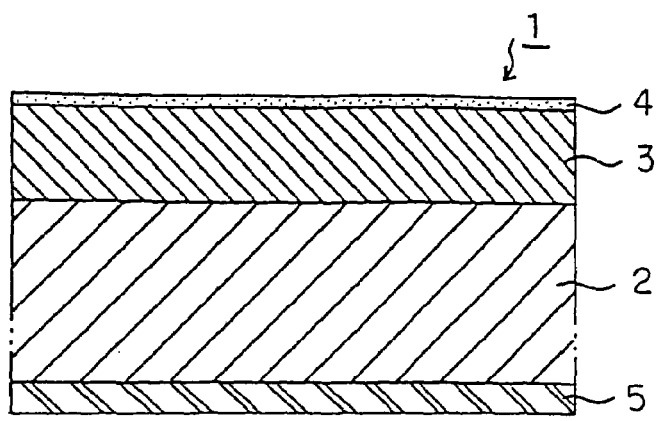
FIG. 1 is a schematic view showing the structure of a first embodiment of the magnetic tape according to the present invention.

A magnetic tape 1 shown in FIG. 1 comprises a substrate 2 having provided thereon an intermediate layer 3 and a magnetic layer 4 as a top layer adjoining the intermediate layer 3. The magnetic layer 4 serves as a recording surface. The substrate 2 has on the other side a layer 5 containing a coloring matter (hereinafter referred to as a color-containing layer). The color-containing layer serves as a non-recording surface.

The term "recording surface" as used herein means a surface used for magnetic recording, and the term "non-recording surface" as used herein means a surface which does not participate in magnetic recording.

The magnetic tape 1 is for a serpentine recording system, in which the magnetic layer 4 contains a plurality of data tracks in parallel with the tape running direction. On use, a head unit having a prescribed number of magnetic heads is moved across the magnetic tape 1, switching among data tracks, to record or reproduce data on the prescribed data track. In order to position each magnetic head on a proper data track by track switching for recording or reproduction, servo tracking is carried out.

The color-containing layer 5 is an outermost layer on one side of the magnetic tape 1. It contains a coloring matter that changes its color on being irradiated with light having a prescribed wavelength and therefore changes its absorbance of light having a prescribed wavelength. The light causing a color change and the light for detecting an absorbance change may have the same or different wavelengths. The term "light" as used herein means not only visible light but light of other wavelength regions. Accordingly, the term "coloring matter" as used herein is intended to include not only substances which show a color with visible light, i.e., absorb light having a visible wavelength, but those substances which absorb light of other wavelength regions, for example, near infrared wavelengths.

The color-containing layer 5 provided on the side of the non-recording surface of the magnetic tape 1 is used as a region on which a regular pattern for servo tracking having different optical properties from the other major region of the side of the non-recording surface is to be formed. While not limiting, the optical properties as referred to herein include the properties as expressed in terms of reflectance or transmission of light.

The coloring matter in the color-containing layer 5 changes its color on being irradiated with light having a prescribed wavelength from the side of the color-containing layer 5 to form a prescribed color-changed pattern furnishing servo signals. The method for forming the color-changed pattern is explained by referring to FIG. 2.

Figure 2:
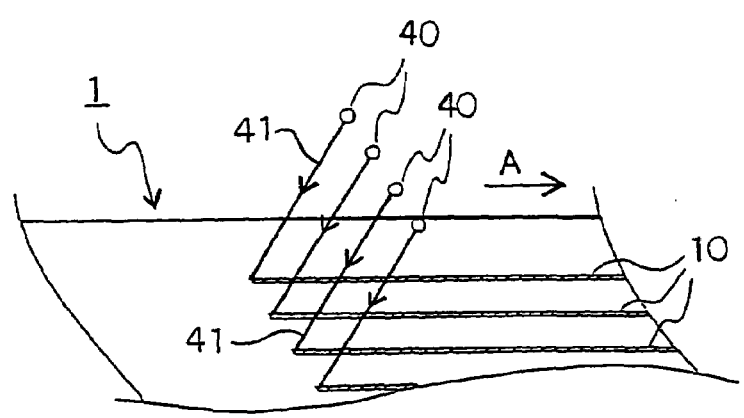
FIG. 2 schematically illustrates a method for forming a color-changed pattern by irradiating a backcoating layer with a light beam.

As shown in FIG. 2, a plurality of laser beams 41 are emitted in parallel from the respective laser light sources 40 aligned at prescribed intervals across the width direction of the magnetic tape 1 and illuminate the color-containing layer 5 running in direction A at a predetermined speed. The coloring matter thus irradiated with laser beams 41 undergoes decomposition by the light energy to change its color. The irradiation conditions of the laser beams 41 should be controlled so as to cause the coloring matter in the color-containing layer 5 to change its color. The color change of the coloring matter provides a prescribed color-changed pattern 10 in the color-containing layer 5 (the color-changed pattern 10 shown in FIG. 2 is not to scale). The degree of the color change is such that can be recognized by measuring the intensity of transmitted light, reflected light or phosphorescence. The color-changed pattern obtained in this embodiment is comprised of a plurality of continuous lines of prescribed width in parallel to the longitudinal direction of the magnetic tape 1 as illustrated in FIG. 2. The width w of each line and variation of the degree of color change in the thickness direction of the color-containing layer 5 can be adjusted by controlling the beam diameter and output power of the laser beams 41. In this embodiment, the beam diameter is preferably 0.25 to 30 µm, particularly 1 to 25 µm, and the output power is preferably 1 to 1000 mW, particularly 10 to 100 mW. The wavelength of the laser beams is selected appropriately according to the kind of the coloring matter so that the coloring matter may show a detectable color change. The color-changed pattern 10 can be formed by use of an exclusive device before use of the magnetic tape 1 or by use of a recording and reproducing drive equipped with an irradiating means as shown in FIG. 2.

Figure 3:
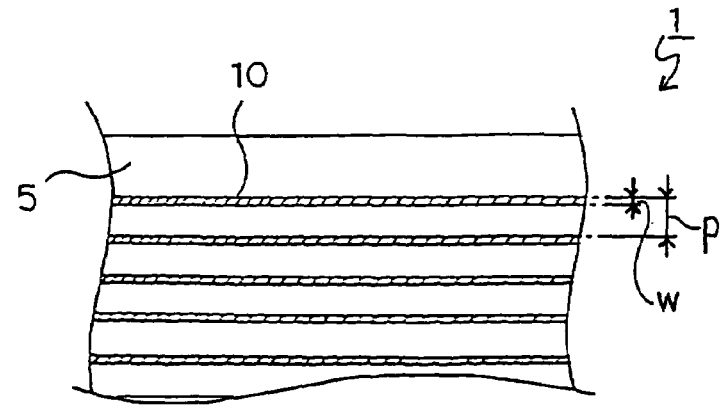
FIG. 3 is an enlarged partial view of the irradiated backcoating layer.

FIG. 3 is referred to for going into details of the color-changed pattern thus formed. The color-changed pattern 10 is comprised of straight lines having a prescribed width w, arrayed in parallel to each other in the longitudinal direction of the tape and spaced equally in the width direction of the tape. While, in general, the color-changed pattern 10 is formed over the whole length of the color-containing layer 5 which corresponds to the length of the magnetic layer 4, the area in which a color-changed pattern is to be formed is not limited thereto. The color-changed pattern 10 makes an optical contrast with the other non-irradiated areas of the color-containing layer 5 showing no color change. As stated previously, data tracks of the magnetic layer 4 are formed in parallel in the longitudinal direction of the magnetic tape 1 similarly to the color-changed pattern 10, but the relative positional relationship between the data tracks and the color-changed pattern 10 is not particularly limited.

The optical contrast can be made by irradiating the color-changed pattern 10 with light of prescribed wavelength to produce a difference in intensity of transmitted light or reflected light.

Where the contrast of transmitted light intensity is used for servo control, the intensity of transmitted light is detected and processed by an optical servo mechanism, such as push-pull method or three-beam method, to carry out servo tracking. In using the contrast of reflected light intensity, the intensity of reflected light is detected and processed similarly. The optical servo mechanisms, such as push-pull method and three-beam method, are techniques commonly employed for achieving optical servo control in various optical disks.

Servo control based on the contract of transmitted light intensity by push-pull method is carried out as follows. In FIG. 4(a), magnetic tape having the color-containing layer 5 runs in the direction perpendicular to the surface of the paper. Light is emitted from a light source 30, such as a semiconductor laser, which is placed to face the color-containing layer 5, condensed through a lens 31 to a prescribed beam diameter, and enters the color-changed pattern 10 formed in the color-containing layer 5. The beam diameter should be somewhat smaller than the line width of the color-changed pattern. Light transmitted through the color-changed pattern 10, the substrate 2 (not shown), the intermediate layer 3 (not shown), and the magnetic layer 4 (not shown) is detected by a light detector 33. The transmitted light, which corresponds to the servo signals recorded in the color-changed pattern 10, is converted to electrical signals in the light detector 33 and sent to a servo tracking processor 34, where the symmetry of the transmitted light beam intensity is analyzed. If the beam intensity displays bilateral symmetry, it means that the center of the beam 35 is on the center line of the line width of the color-changed pattern 10 as shown in FIG. 4(b). This state is an "on-track" state, that is, the magnetic head is properly positioned on an aimed data track of the magnetic layer 4. If the beam intensity lacks bilateral symmetry, it indicates that the beam 35 is deviating from the center line to either left or right as shown in FIG. 4(c) or (d). This state is an "off-track" state, that is, the magnetic head is not properly positioned on the aimed data track of the magnetic layer. Then the servo tracking processor 34 gives a drive 35 of the magnetic head 34 instructions to move the magnetic head 36 to a proper position as shown in FIG. 4(a). As a result, the magnetic head 36 is properly positioned by the drive 35 to achieve an "on-track" state. The wavelength of the light used in the serve control is selected appropriately in conformity with the colors of the coloring matter before and after color change.

The line width w (see FIG. 3) of the color-changed pattern 10 is preferably 0.25 to 50 μm while somewhat varying with the width of the magnetic tape 1. If the line width w is smaller than 0.25 μm, optical detection of the color-changed pattern may be disturbed because it is difficult to condense the beam to such a small diameter with the state-of-the-art technique. If the line width w exceeds 50 μm, the density of the color-changed pattern 10 decreases where the pattern is comprised of a large number of lines as illustrated in FIG. 3. A preferred line width w of the color-changed pattern 10 is 0.25 to 30 μm, particularly 0.8 to 25 μm.

It is preferred that the pitch p of the color-changed pattern 10, i.e., the pitch of the lines (see FIG. 3) be not less than the width of the data track formed on the magnetic layer 4 and be an integral multiple of the width of the data track.

Where transmitted light is used for reading servo signals, it is preferable for the magnetic tape 1 before color change (i.e., before recording of the servo signals) to have a transmission of 3% or higher, particularly 5% or higher, at the wavelength of the light to be used for reading the servo signals. A higher transmission is better with no particular upper limit, but a practical maximum of the transmission of the whole magnetic tape 1 would be about 40%, being limited by the low light transmitting properties of the magnetic layer 4.

For achieving precise servo control, it is preferred that the difference in transmission at the wavelength of incident light used for servo signal reading between the color-changed pattern 10 and the other major region of the side of the non-recording surface, i.e., the value represented by equation (1) shown below be 10% or more, particularly 40% or more.

$$\text{Difference in transmission (\%)} = \frac{|T_M - T_O|}{T_M} \times 100 \qquad (1)$$

wherein $T_O$ represents a transmission (%) of a servo tracking pattern at the wavelength of incident light; and $T_M$ represents a transmission (%) of the area other than the servo tracking pattern at the wavelength of incident light.

The lines composing the color-changed pattern 10 may be arranged over the whole width of the magnetic tape 1 at prescribed intervals, or a group of lines spaced at prescribed intervals may be localized in, for example, the central portion or either one of side portions of the tape in the width direction. There may be two or more groups of lines localized in two or more positions of the tape in the width direction. For example, one or more than one groups of lines, which may consist of the same or different number of lines, can be arranged on each side portion of the tape, one or more than one groups of lines, which may consist of the same or different number of lines, can be arranged on the central portion and one of the side portions of the tape, or one or more than one groups of lines, which may consist of the same or different number of lines, can be arranged on the central portion and each side portion of the tape. In any case, the total number of the lines making up the color-changed pattern 10 is preferably a measure of the number of the data tracks of the magnetic layer 4.

The coloring matter which can be used in the color-containing layer 5 is not particularly limited as long as it changes its color on being irradiated with light having a prescribed wavelength and changes its absorbance of light having a prescribed wavelength. Examples of preferred coloring matters include organic coloring matters, such as cyanine dyes, squarylium dyes, chroconium dyes, azulenium dyes, triarylamine dyes, anthraquinone dyes or pigments, metallized azo dyes or pigments, dithiol metal complex dyes, indoaniline metal complex dyes; phthalocyanine pigments, naphthalocyanine pigments, porphyrin pigments, and intramolecular charge transfer complexes. These coloring matters can be used either individually or as a mixture of two or more thereof.

Cyanine dyes represented by formula (1) or (2) shown below are particularly preferred for their satisfactory compatibility with a binder (hereinafter described). These cyanine dyes have an absorption in the near infrared region.

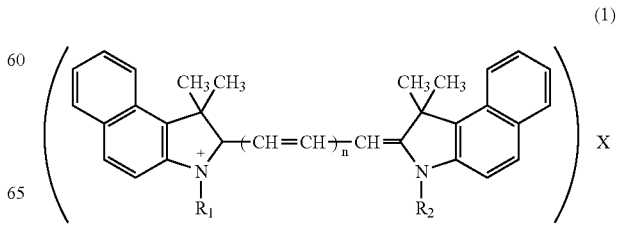

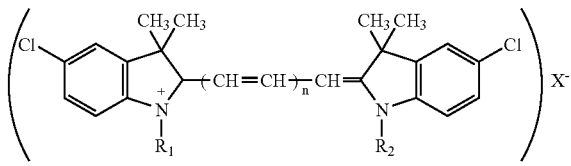

(2)

wherein $R_1$ and $R_2$, which may be the same or different, each represent a hydrocarbon group having 1 to 5 carbon atoms; n and m each represent a number of 1 to 5; and $X^-$ represents a monovalent anion.

The color-containing layer 5 may be formed solely of the coloring matter but preferably contains a binder so that the color-containing layer 5 may serve as a backcoating layer which can improve the running properties or durability of the magnetic tape 1. The weight ratio of the coloring matter to the binder, which is subject to variation according to the kind of the coloring matter, is preferably from 0.01:100 to 10:100, still preferably from 0.05:100 to 5:100.

Any binder customarily employed in magnetic tape is usable. For example, thermoplastic resins, thermosetting resins, reactive resins, and mixtures thereof can be used. Specific examples are vinyl chloride copolymers or modified vinyl chloride copolymers, copolymers comprising acrylic acid, methacrylic acid or esters thereof polyvinyl alcohol copolymers, acrylonitrile copolymers (rubbery resins), polyester resins, polyurethane resins, epoxy resins, cellulosic resins (e.g., nitrocellulose, cellulose acetate, cellulose acetate butyrate, cellulose acetate propionate, etc), polyvinyl butyral resins, and polyamide resins. These binders preferably have a number average molecular weight of 2,000 to 200,000. The binder resin can have a polarizing functional group (so-called polar group), such as a hydroxyl group, a carboxyl group or a salt thereof, a sulfoxyl group or a salt thereof, a phospho group or a salt thereof, a nitro group, a nitric ester group, an acetyl group, a sulfuric ester group or a salt thereof, an epoxy group, a nitrile group, a carbonyl group, an amino group, an alkylamino group, an alkylammonium salt group, a sulfobetaine structure, a carbobetaine structure, and the like, to have improved dispersing properties for particulate additives which could be incorporated into the color-containing layer 5 (hereinafter described).

It is preferred for the color-containing layer 5 to contain an antioxidant to improve the stability of the coloring matter. In order to secure sufficient stability of the coloring matter, the antioxidant is preferably added in an amount of 0.5 to 20 parts by weight, particularly 3 to 10 parts by weight, per 100 parts by weight of the coloring matter. Any antioxidant for organic coloring matters can be used. Specific examples of suitable antioxidants are bis(4-t-butyl-1,2-dithiophenolate) copper-tetra-n-butylammonium and bis(4-t-butyl-1,2-dithiophenolate)nickel-tetra-n-butylammonium.

As stated above, the color-containing layer 5 is essentially used for recording servo signals for servo tracking but preferably combines the functions as a backcoating layer. Such functions include (1) giving satisfactory running properties, (2) giving antistatic properties, and (3) detecting the beginning of the tape (BOT) or the end of the tape (EOT).

To perform the function (1), it is preferred for the color-containing layer 5 to have a moderate surface roughness. On the other hand, it is preferred for the color-containing layer 5 to be as smooth as possible to prevent the surface profile of the color-containing layer 5 from being transferred to the magnetic layer 4 when the magnetic tape is rolled up. Taking the balance between these conflicting requirements into consideration, the color-containing layer 5 preferably has an arithmetic mean roughness Ra of 7 to 50 nm, particularly 8 to 30 nm, and a 10 point height parameter Rz of 40 to 250 nm, particularly 50 to 200 nm. It is also preferred for the color-containing layer 5 to have a coefficient of dynamic friction of 0.15 to 0.35.

The arithmetic mean roughness Ra, defined by the following equation (i), is measured with a stylus-type profilometer under the following conditions in accordance with JIS-B0601-1994.

Stylus: diameter: 1.5 to 2.5 µm; curvature: 60°
Contact pressure: 50 to 300 µN
Cut-off length: 80 µm
Sampling length: 80 µm
Assessment length: 400 µm $$Ra = \frac{1}{l} \int_0^l |Y(x)| dx \qquad (i)$$

wherein Y represents profile data; and l represents an assessment length.

In measuring the surface roughness Ra, a sample is stuck to a slide glass for microscopes which satisfies the requirements specified in JIS-R-3502 (e.g., a slide glass produced by MATSUNAMI GLASS K. K. as used in the present invention) with water or ethanol to prepare a specimen. Existence of excessive water or ethanol will ruin the reproducibility of measurements. Therefore measurement is made after the water or ethanol is evaporated to some extent and while an interference fringe can be seen from the back side of the slide glass.

Measurement of the 10 point height parameter Rz, defined by the following equation (ii), can be made using the same specimen under the same conditions as for the measurement of Ra in accordance with JIS-B0601-1994. The sampling length l is 80 µm, and the assessment length $l_o$ is 400 µm.

$$Rz = \frac{|Y_{p1} + Y_{p2} + Y_{p3} + Y_{p4} + Y_{p5}| + |Y_{v1} + Y_{v2} + Y_{v3} + Y_{v4} + Y_{v5}|}{5} \qquad (ii)$$

wherein $Y_{p1}$, $Y_{p2}$, $Y_{p3}$, $Y_{p4}$, and $Y_{p5}$ are heights of the five highest peaks within the assessment length l; and $Y_{v1}$, $Y_{v2}$, $Y_{v3}$, $Y_{v4}$, and $Y_{v5}$ are height of the five lowest valleys within the assessment length l.

In order for the color-containing layer 5 to have the arithmetic mean roughness Ra and the 10 point height parameter Rz within the respective preferred ranges, it is preferable to incorporate inorganic powder having an average particle size of 1 to 700 nm into the color-containing layer 5. It is particularly preferable to incorporate two or more kinds of inorganic powders including particles having an average particle size of 1 to 100 nm (hereinafter referred to as powder A) and particles having an average particle size of 50 to 700 nm hereinafter referred to as powder B). A preferred mixing ratio of powder A to powder B ranges from 100:0.1 to 100:20, particularly from 100:0.2 to 100:15, by weight. The powders A and B are not particularly limited in kind as long as their average particle sizes satisfy the above respective ranges and include, for example, spherical particles of TiO, $TiO_2$, $\alpha\text{-}Fe_2O_3$, $BaCO_3$, $BaSO_4$, $Fe_3O_4$, $\alpha\text{-}Al_2O_3$, $\gamma\text{-}Al_2O_3$, $CaCO_3$, $Cr_2O_3$, ZnO, $ZnSO_4$, $\alpha\text{-}FeOOH$, Mn—Zn ferrite, Ni—Zn ferrite, ZnS, tin oxide, antimony-doped tin oxide (ATO), indium-doped tin oxide (ITO), indium oxide, carbon black, graphite carbon, $SiO_2$, and silicone resins having a three-dimensional network structure made up of siloxane bonds with a methyl group bonded to the silicon atom. The powders A and B may be the same or different in kind.

Of the above-enumerated inorganic powders, black powder, such as carbon black, has high light shielding properties. If such black powder is added to the color-containing layer in a large proportion, the color-containing layer 5 may not sufficiently transmit light, which is unfavorable where transmitted light is made use of for servo signal reading. In this case, it is recommended not to use such black particles at all or to use non-black particles as the powder B whose particle size is smaller than the thickness of the color-containing layer 5 in combination with such black particles, thereby to achieve the function (1). Powder B, defined to have an average particle size of 50 to 700 nm, preferably has an average particle size of 50 to 500 nm. Powder B is preferably added in an amount of 0.5 to 150 parts by weight, particularly 1 to 80 parts by weight, especially 2 to 40 parts by weight, per 100 parts by weight of the binder.

To perform the function (2), it is preferred for the color-containing layer 5 to contain an electrically conductive inorganic substance (hereinafter simply referred to as conductive substance). Although black particles such as carbon black can be mentioned as typical examples of conductive substances, incorporation of such black particles into the color-containing layer 5 in a large proportion may cause the same problem as described above where transmitted light is used for serve signal reading. It would be a preferred embodiment, therefore, not to use such black particles at all or to use non-black conductive particles as the powder A in combination with such black particles, thereby to obtain the function (2). To perform the function (2), the magnetic tape 1 preferably has a surface resistivity of not more than $1 \times 10^9$ $\Omega$/square on the side of the color-containing layer 5. The lower, the better with no particular lower limit.

The non-black inorganic conductive particles include particles of conductive tin oxide, ATO, ITO, and indium oxide. These inorganic conductive substances are advantageous because of their high light transmitting properties in the case where transmitted light is utilized for servo signal reading. In this connection, especially preferred inorganic conductive particles are tin oxide, ATO, ITO, and indium oxide. The inorganic conductive particles used as powder A preferably have an average particle size of 1 to 100 nm, particularly 2 to 100 nm, especially 5 to 50 nm. The inorganic conductive particles (used as powder A) is preferably added in an amount of 10 to 800 parts, particularly 30 to 700 parts, especially 50 to 700 parts, by weight per 100 parts by weight of the binder.

In order to obtain an arithmetic mean roughness Ra and a 10 point height parameter Rz falling within the respective preferred ranges and to sufficiently obtain the function (2), the total amount of powders A and B to be added to the color-containing layer 5 preferably ranges from 50 to 800 parts by weight, particularly 100 to 700 parts by weight, per 100 parts by weight of the binder.

The function (3) as the backcoating layer can be performed by the color-changed pattern 10. EOT or BOT has been detected by a light transmission method so that the backcoating layer of conventional magnetic tape should contain carbon black. In the present invention, the color-containing layer 5 which also serves as a backcoating layer does not need to contain carbon black for that detection, which establishes an extreme advantage for the optical serve control using transmitted light.

If desired, the color-containing layer 5 can contain additives, such as a lubricant and a hardener.

Generally useful lubricants include fatty acids and fatty acid esters. Examples of the fatty acid lubricants are caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid. Examples of the fatty acid ester lubricants are alkyl esters of the above-enumerated fatty acids having 16 to 46 carbon atoms in total.

Inorganic acid esters, such as phosphoric esters, fluorine-containing compounds, silicone compounds, and the like are also useful as lubricants.

The lubricants are added in an amount of 0.05 to 15 parts by weight, preferably 0.2 to 10 parts by weight, per 100 parts by weight of the binder.

The hardeners include isocyanate hardeners, exemplified by "CORONATE L" (a trade name, produced by NIPPON POLYURETHANE INDUSTRY Co., Ltd.) and amine hardeners. The hardeners are added in an amount of 5 to 40 parts by weight, preferably 5 to 30 parts by weight, per 100 parts by weight of the binder.

If desired, the color-containing layer 5 can further contain stabilizers for the coloring matter or sensitizers.

The color-containing layer 5 is formed by coating the substrate 2 with a color-containing coating composition having the above-mentioned components dispersed in a solvent. Examples of suitable solvents include ketones, esters, ethers, aromatic hydrocarbons, chlorinated hydrocarbons, and cellosolve solvents. The solvent is preferably used in such an amount that the coating composition may have a solids content of 10 to 50% by weight, particularly 20 to 40% by weight.

The thickness of the color-containing layer 5, formed by applying the color-containing coating composition, is preferably 0.1 to 2.0 µm, still preferably 0.2 to 1.5 82 m, taking into consideration the transmission of the color-changed pattern 10 and the thickness balance with the magnetic layer 4 and the intermediate layer 3.

The color-containing layer 5 of the magnetic tape 1 according to this embodiment has a color-changed pattern 10 of a plurality of lines along the longitudinal direction of the magnetic tape 1 as shown in FIG. 3. The pattern of a plurality of lines can be replaced by a single straight line along the longitudinal direction of the tape 1. The pattern can be a single or a plurality of sine curves along the longitudinal direction of the tape 1. Further, the pattern 10 can be comprised of discontinuous pieces of lines along the longitudinal direction of the tape 1 as shown in FIG. 5.

The color-changed pattern 10 shown in FIG. 5 is made up of a repetition of pairs of a piece 10a angled at $\Theta°$ with the longitudinal direction of the magnetic tape 1 and a piece 10b angled at $-\Theta°$, the pieces 10a and 10b alternating with each other in the longitudinal direction of the tape 1. The angle $\Theta$ has an influence on the precision of positioning by servo tracking. A preferred angle $\Theta$ for securing sufficient precision of positioning is 5 to 85°, particularly 10 to 30°. The lengths of the pieces 10a and the pieces 10b may be the same or different but are preferably the same. A preferred length of the pieces 10a and 10b is 5 to 140 mm, particularly 5 to 80 mm. The spacing g between the piece 10a and the piece 10b making each pair is preferably as narrow as possible. The servo signals of the color-changed pattern 10 shown in FIG. 5 can be read in the same manner as for the pattern 10 shown in FIG. 3.

Figure 7:
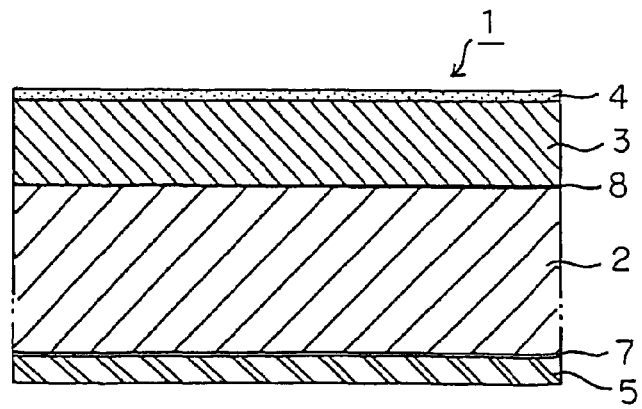
FIG. 7 is a schematic view showing the structure of a third embodiment of the magnetic tape according to the present invention.
Figure 8:
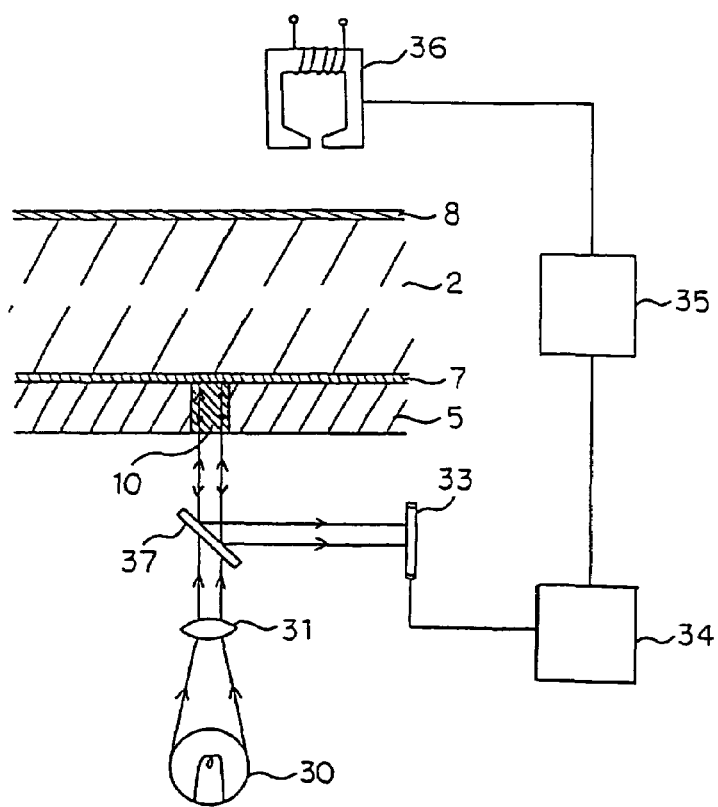
FIG. 8 schematically illustrates a method for achieving servo control on the third embodiment of the magnetic tape according to the present invention.
Figure 9:
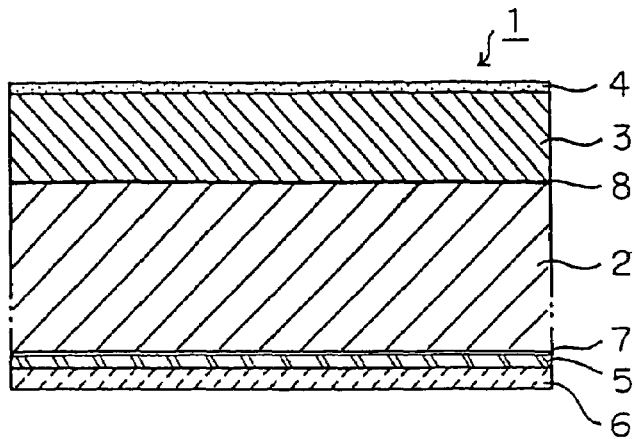
FIG. 9 is a schematic view showing the structure of a fourth embodiment of the magnetic tape according to the present invention.
Figure 10:
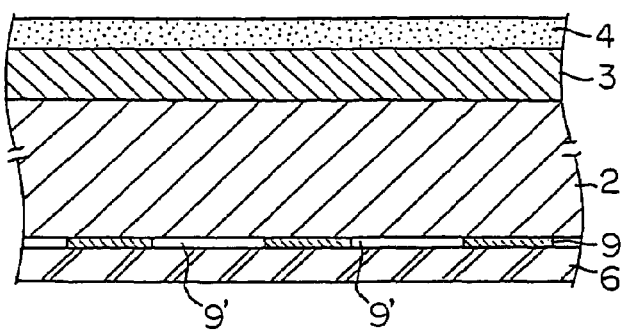
FIG. 10 is a schematic view showing the structure of a fifth embodiment of the magnetic tape according to the present invention.
Figure 11:
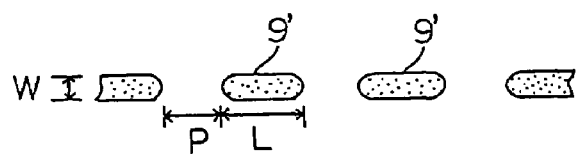
FIG. 11 is an enlarged plane view of servo tracking pattern of the magnetic tape shown in FIG. 10.
Figure 12:
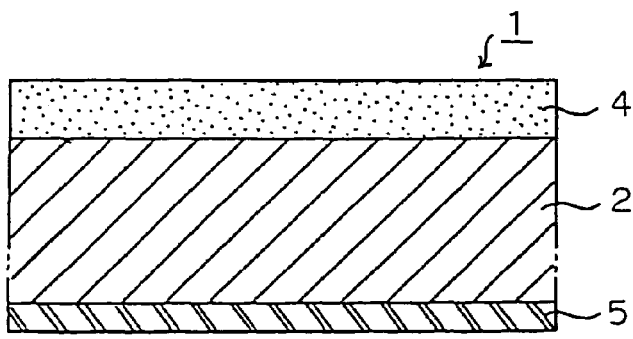
FIG. 12 is a schematic view showing the structure of another embodiment of the magnetic tape according to the present invention (corresponding to FIG. 1)
Figure 13:
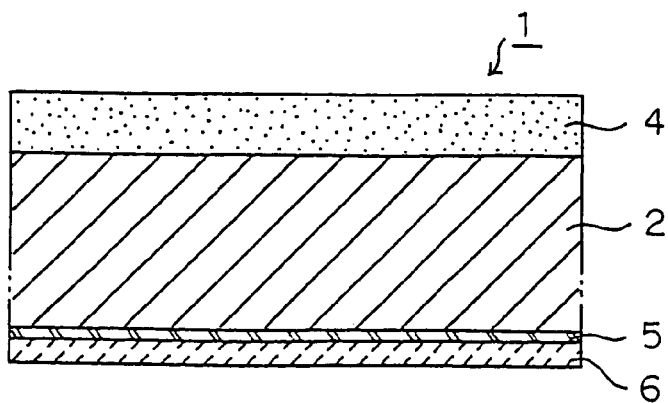
FIG. 13 is a schematic view showing the structure of another embodiment of the magnetic tape according to the present invention (corresponding to FIG. 6)
Figure 14:
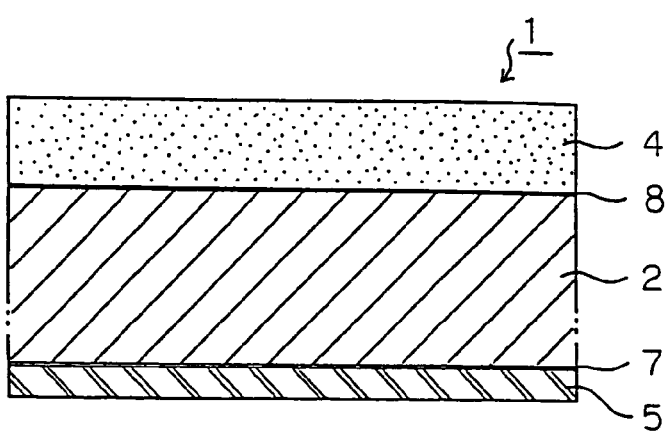
FIG. 14 is a schematic view showing the structure of another embodiment of the magnetic tape according to the present invention (corresponding to FIG. 7)
Figure 15:
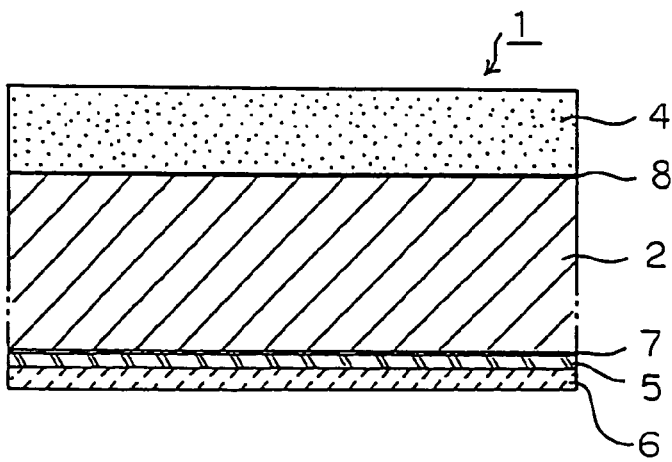
FIG. 15 is a schematic view showing the structure of another embodiment of the magnetic tape according to the present invention (corresponding to FIG. 9).

The second to fifth embodiments of the magnetic tape according to the present invention will be illustrated with reference to FIGS. 6 through 11, wherein FIG. 6, which corresponds to FIG. 1 of the first embodiment, schematically shows the structure of the second embodiment; FIG. 7, which corresponds to FIG. 1 of the first embodiment, schematically shows the structure of the third embodiment; FIG. 8 schematically illustrates a method for obtaining servo information from the third embodiment, corresponding to FIG. 4 for the first embodiment; FIG. 9 schematically shows the structure of the fourth embodiment, corresponding to FIG. 7 of the third embodiment; FIG. 10 schematically shows the structure of the fifth embodiment; and FIG. 11 is a plane view of the servo tracking pattern of the magnetic tape shown in FIG. 10. The second to fifth embodiments will be explained only with regard to differences from the first embodiment. As for the same details as with the first embodiment, while not noted particularly, the descriptions given to the first embodiment apply appropriately. The same numerical references as used in FIGS. 1 through 5 are used for the same elements in FIGS. 6 to 11.

Figure 6:
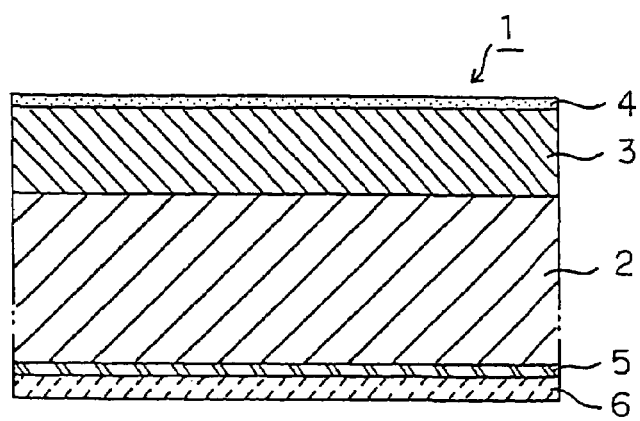
FIG. 6 is a schematic view showing the structure of a second embodiment of the magnetic tape according to the present invention.

Similarly to the first embodiment, the magnetic tape 1 according to the second embodiment shown in FIG. 6 has a color-changed pattern affording servo information on its color-containing layer 5 before use. When the magnetic tape 1 is first used, the color-changed pattern is irradiated from one side of the tape 1 with light having a prescribed wavelength, and the transmitted light is detected from the other side. Thus the recorded servo signals are read as contrast of transmitted light intensity. The difference of the second embodiment from the first one resides in that the color-containing layer of the first embodiment combines the function as a backcoating layer, whereas the magnetic tape 1 of the second embodiment has a backcoating layer 6 as an outermost layer independently of the color-containing layer 5. Accordingly, the function for recording and reading servo signals and the function as a backcoating layer are separately performed by the respectively designed layers, which is advantageous in that the freedom of design of the magnetic tape 1 is increased over the first embodiment.

The color-containing layer 5 used in the second embodiment preferably consists solely of a coloring matter or comprises other components in addition to the coloring matter.

The color-containing layer 5 consisting solely of the coloring matter can be formed by, for example, the following methods (1) to (3).

(1) A thin film formation processing, such as chemical vapor deposition (CVD) or physical vapor deposition (PVD).
(2) A method comprising coating the substrate 2 with a solution of the coloring matter in a solvent which can, if desired, contain a surface active agent.
(3) A method comprising co-extruding the substrate 2 with a solution of the coloring matter in a polymer or a polymer emulsion.

Where the color-containing layer 5 comprises the coloring matter and other components, the other components include a binder, inorganic powder, a lubricant, and the like that could be incorporated into the color-containing layer of the first embodiment. With regard to the details of these components and their amounts to be added, refer to the first embodiment. In particular, the above-described powders A and B can be incorporated to impart antistatic properties to the color-containing layer 5. In addition, the incorporation of the powders A and B prevents disturbances of the interface between the color-containing layer 5 and the backcoating layer 6 when these two layers are formed by simultaneous coating in a wet-on-wet system, which will be described later in detail. The color-containing layer 5 comprising these components is formed by coating the substrate with a color-containing coating composition prepared by dispersing these components in a solvent. As to the details of the color-containing coating composition, the descriptions given to the first embodiment apply appropriately.

Because the color-containing layer 5 has no function as a backcoating layer, its thickness may be smaller than that required in the first embodiment. A preferred thickness is 30 to 200 nm, particularly 50 to 150 nm.

In order for the backcoating layer 6 to perform its own essential functions, it is preferred for this layer to contain a binder, inorganic powder (particularly the powders A and B), a lubricant, a hardener, and the like. As to the details of these components, refer to the first embodiment. The inorganic powder is preferably used in an amount of 50 to 800 parts by weight, particularly 70 to 700 parts by weight, per 100 parts by weight of the binder. The lubricant is preferably used in an amount of 0 to 20 parts by weight, particularly 0 to 10 parts by weight, per 100 parts by weight of the binder. The hardener is preferably used in an amount of 0 to 40 parts by weight, particularly 5 to 30 parts by weight, per 100 parts by weight of the binder.

Similarly to the first embodiment, it is preferred for adjusting the light transmission of the magnetic tape as a whole within the above-described preferred range that the inorganic powder added to the backcoating layer 6, especially conductive powder, have light transmitting properties. Accordingly, it is preferred for the inorganic powder to have a non-black color and have a small particle size within an appropriate range. Specifically, the inorganic powder preferably has a particle size of 1 to 100 nm, particularly 2 to 100 nm, especially 5 to 50 nm. In order to further improve the running properties of the backcoating layer 6, such small particles can be used in combination with inorganic powder having a particle size of 50 to 700 nm (e.g., the powder B).

The backcoating layer 6 can be formed by coating the color-containing layer 5 with a backcoating composition having the above-described components dispersed in a solvent. Where the color-containing layer 6 is formed by applying a coating composition containing the coloring matter dissolved in a solvent (the coating composition used in the method (2) described above) or the above-described color-containing coating composition comprising the coloring matter, the binder, and carbon black, etc., such a color-containing composition and the backcoating composition can be applied either by successive coating or simultaneous coating. Noting that the successive coating method has lower productivity and entertains a fear of the coloring matter's dissolving out of the color-containing layer 5 and mixing with the backcoating composition, preferred is the simultaneous coating method according to a wet-on-wet system, which achieves higher productivity and is free from such a fear.

The backcoating layer 6 preferably has a thickness of 0.1 to 1.0 μm, particularly 0.2 to 1.0 μm, from the viewpoint of sufficient manifestation of the running properties and durability of the magnetic tape 1 and the balance with the total thickness of the intermediate layer 3 and the magnetic layer 4 formed on the side of the recording surface.

The magnetic tape 1 of the third embodiment shown in FIG. 7 has a color-changed pattern affording servo signals on its color-containing layer 5 before use similarly to the first embodiment. The difference from the first embodiment lies in that a metallic thin layer(s) 7 and/or 8 is/are provided between the substrate 2 (e.g., a plastic film) and the color-containing layer 5 and/or between the substrate 2 and the intermediate layer 3 and that the servo signals are read by irradiating the side of the color-containing layer of the magnetic tape 1 with light of prescribed wavelength and then detecting the intensity of light reflected on the metallic layer. In other words, in the first embodiment servo control is achieved through detection of transmitted light while in the third embodiment servo signals are read from the reflected light, using a composite of the substrate 2 (plastic film) and the metallic thin layer(s) as a substrate. Either one of the metallic thin layers 7 and 8, particularly the layer 7 suffices as a light reflecting layer.

The servo control mechanism of the third embodiment is illustrated in FIG. 8 corresponding to FIG. 4(a) for the first embodiment, in which the intensity of the reflected light is detected to carry out servo tracking. In FIG. 8, the intermediate layer 3 and the magnetic layer 4 of the magnetic tape shown in FIG. 7 are not shown.

The servo control shown in FIG. 8 is carried out by push-pull method similarly to that shown in FIG. 4. In FIG. 8, magnetic tape runs in the direction perpendicular to the surface of the paper. Light is emitted from a light source 30, such as a semiconductor laser, which is placed to face the color-containing layer 5, condensed through a lens 31 to a prescribed beam diameter, passes through a half mirror 37, and enters the color-changed pattern 10 formed in the color-containing layer 5. The beam diameter should be somewhat smaller than the line width of the color-changed pattern 10. The light transmitted through the color-changed pattern 10 is reflected on the metallic thin layer 7 and advances in the direction opposite to the incidence direction. The reflected light is reflected on the half mirror 37, turning its direction, and enters the light detector 33, where the intensity of the reflected light is detected. The detected reflected light, which corresponds to the servo signals recorded in the color-changed pattern 10, is converted to electrical signals in the detector 33 and then sent to the servo tracking processor 34, where the signals are processed in the same manner as in the servo control system of FIG. 4. The descriptions given to the system of FIG. 4 apply accordingly.

Materials having a high reflectance, such as Au, Al, Ag, and alloys based on these metals, are preferably used for the metallic thin layers 7 and 8. The materials making the metallic thin layers 7 and 8 may be the same or different.

Both metallic thin layers 7 and 8 are preferably formed by known vacuum thin film processing. Metallic thin layers thus formed exhibit extremely high anticorrosion to provide magnetic tape with excellent storage durability. Vacuum thin film processing is selected according to the material forming the layers 7 or 8 from among vacuum deposition, sputtering, ion plating, and the like.

The metallic thin layers 7 and 8 each have a thickness enough to reflect the incident light sufficiently. Such a thickness is preferably 0.01 to 1 µm, still preferably 0.02 to 0.7 µm. The two layers may have the same or different thicknesses.

The side of the color-containing layer 5 of the magnetic tape 1 according to the third embodiment preferably has a reflectance of at least 5%, particularly 10% or more, especially 15% or more, at the wavelength of the light to be used for servo signal reading, before the servo signals are recorded. Higher reflectances are better with no particular upper limit, but a practical maximum would be about 70%.

For achieving precise servo control, it is preferred that the difference in reflectance at the wavelength of incident light used for servo signal reading between the color-changed pattern 10 and the other area of the non-recording surface, i.e., the value represented by equation (2) shown below be 10% or more, particularly 40% or more.

$$\text{Difference in reflectance (\%)} = \frac{|R_M - R_O|}{R_M} \times 100 \qquad (2)$$

wherein $R_O$ represents a reflectance (%) of a servo tracking pattern at the wavelength of incident light; and $R_M$ represents a reflectance (%) of the area other than the servo tracking pattern at the wavelength of incident light.

Where the magnetic tape 1 has the metallic thin layer 7, the layer 7 combines two functions; it acts as a reflective film and also serves for static prevention. That is, the color-containing layer 5 of the third embodiment does not need to contain carbon black or any other conductive inorganic particles as an antistatic agent unlike the first embodiment. It follows that the color-containing layer 5 has a higher transmission than that used in the first embodiment thereby providing reflected light with higher intensity, which enhances the precision of servo control.

The magnetic tape 1 according to the fourth embodiment shown in FIG. 9 has a metallic thin layer(s) 7 and/or 8 between the substrate 2 and the color-containing layer 5 and/or between the substrate 2 and the intermediate layer 3 so that the servo information can be obtained from the reflected light in the same manner as in the third embodiment. The difference from the third embodiment consists in that the color-containing layer of the third embodiment combines the function as a backcoating layer, whereas the magnetic tape 1 of the fourth embodiment has a backcoating layer 6 as an outermost layer independently of the color-containing layer 5. The color-containing layer 5 and the backcoating layer 6 of the fourth embodiment are structurally the same as those of the second embodiment. That is, the magnetic tape 1 of the fourth embodiment has a combination of the color-containing layer 5 and the backcoating layer 6 according to the second embodiment and the metallic thin layers 7 and 8 according to the third embodiment. Accordingly, the detailed descriptions given to the second and third embodiments with respect to these elements apply here.

In the fourth embodiment, since the functions for recording and reading servo signals and as a backcoating layer are separately carried out by the respectively designed layers similarly to the second embodiment, the magnetic tape 1 has increased freedom of design over the first embodiment. Further, since the metallic thin layer 7 combines the functions as a reflective layer and for static prevention, the color-containing layer 5 or the backcoating layer 6 does not need to contain carbon black or any other conductive inorganic particles as an antistatic agent. It follows that both the color-containing layer 5 and the backcoating layer 6 have a higher transmission than those used in the second embodiment thereby providing reflected light with higher intensity, which enhances the precision of servo control. Similarly to the third embodiment, the side of the color-containing layer 5 of the magnetic tape 1 according to the fourth embodiment preferably has a reflectance of at least 5%, particularly 10% or more, especially 15% or more, at the wavelength of the light to be used for servo signal reading before the servo signals are recorded. The change in reflectance as defined above is preferably 10% or more, particularly 40% or more, similarly to the third embodiment.

The magnetic tape 1 according to the fifth embodiment shown in FIG. 10 has on the side of the non-recording surface thereof a thin film 9 of a metal or an alloy having a low melting point (hereinafter referred to as a metallic thin layer) and a backcoating layer 6 as a resin layer adjoining the metallic thin layer 9.

A servo tracking pattern can be formed in the metallic thin layer 9 to exhibit optical properties different from the other major region of the side of the non-recording surface. Such a pattern can be formed by, for example, irradiating the metallic thin layer 9 with a laser beam corresponding to servo signals while moving the magnetic tape 1 at a prescribed speed. The irradiated metal or alloy of the metallic thin layer 9 fuses to make depressions 9' (see FIG. 10) of prescribed depth at regular intervals along the longitudinal direction of the tape. The regularly spaced depressions 9' work as the pattern. The metallic thin layer 9 can be irradiated from either side of the non-recording surface or the side of the recording surface but is preferably irradiated from the side of the non-recording surface for efficient pattern formation.

In order to form the servo tracking pattern with which precise servo control can be carried out, the laser beam for pattern formation preferably has a diameter of 0.1 to 30 µm, particularly 1 to 10 µm. The output power of the laser beam is decided so as to cause the metal or alloy constituting the metallic thin layer 9 to fuse sufficiently without damaging the other layers constituting the magnetic tape 1 and the substrate 2. Such an output power preferably ranges from 1 to 50 mW, particularly 3 to 25 mW, per incident beam. Short pulses of a high output laser beam of about 1 to 100 W can also be used. The wavelength of the laser beam is preferably 0.3 to 1.3 µm, particularly 0.5 to 0.8 µm, from the standpoint of the light absorption of the metal or alloy.

As shown in FIG. 11, the plane view of the servo tracking pattern of the fifth embodiment is a single dotted line located on the centerline of the width direction of the tape. Such a pattern assures improved sensitivity in servo signal reading. The depression 9' preferably has a width W of 0.1 to 30 µm, particularly 1 to 20 µm, for obtaining precise servo control and minimizing the thermal influence on the substrate 2 in pattern formation. The length L of each depression 9' (see FIG. 10) is preferably 1 to 100 µm, particularly 10 to 50 µm, to assure servo signal detection. The distance P between every adjacent depressions 9' is preferably 2 to 100 µm, particularly 50 to 90 µm, for reading the individual depressions 9' with high sensitivity. The depth of each depression 9' is preferably at least ⅓, particularly at least ⅔, of the thickness of the metallic thin layer 9 up to the whole thickness of the metallic thin layer 9. In this embodiment shown in FIG. 10, the depressions 9' are formed over the whole thickness of the metallic thin layer 9. While in FIG. 10 the depressions 9' are depicted as hollow parts for convenience' sake, they are in fact filled with the substrate 2 and/or the backcoating layer 6. Since the metallic thin layer 9 is considerably thinner than the backcoating layer 6, filling of the depressions 9 with the backcoating layer 6 does not result in depressions on the surface of the backcoating layer 6. If any depressions occur on the surface of the backcoating layer 6, reduction in surface properties of the backcoating layer 6 due to the depressions would be negligible. Further, the influence of the depressions 9' on the surface of the backcoating layer 6 could be excluded by controlling the surface smoothness (surface roughness Ra and 10 point height parameter Rz) of the backcoating layer 6 as previously described.

For servo signal reading, light having a wavelength of 0.3 to 1.3 µm, particularly 0.5 to 0.8 µm, is preferably used in view of the wavelength dependence of the reflectance or absorbance of the metal or alloy.

The metal or alloy which constitutes the metallic thin layer 9 is selected from those fusible with the quantity of radiation heat that does not damage the other layers making up the magnetic tape 1 and the substrate 2, such as low-melting metals or alloys having a melting point of 500° C. or below. Examples of such metals or alloys include indium, tin, lead, zinc, gallium, selenium, rubidium, cadmium, tellurium, cesium, thallium, bismuth, polonium, astatine, lithium, sodium, potassium, a silver-indium alloy having an indium content of about 25% or more, and a silver-bismuth alloy having a bismuth content of several percents or more. In particular, indium, tin, lead and zinc are preferred for their optical characteristics, such as absorbance, and chemical stability.

The metallic thin layer 9 can be formed by known vacuum thin film processing such as vacuum deposition, sputtering, and chemical vapor deposition. In order to induce a sufficiently large difference in reflectance or transmission, which is as defined above, while minimizing the influence of the depressions 9' on the surface properties of the non-recording surface, the thickness of the metallic thin layer 9 preferably ranges from 5 to 500 nm, particularly from 50 to 300 nm.

General items concerning the magnetic tape according to the present invention are now described. Unless particularly noted, the following description is common to all the aforesaid embodiments.

The magnetic layer 4 is formed by applying a magnetic coating composition comprising ferromagnetic powder and a binder. Namely, the magnetic tape 1 is a magnetic tape of coated type.

The ferromagnetic powder which can be used include acicular, spindle-shaped or tabular particles. Acicular or spindle-shaped ferromagnetic powder includes ferromagnetic metal powder consisting mainly of iron and ferromagnetic iron oxide powder, and tabular ferromagnetic powder includes ferromagnetic hexagonal ferrite powder.

More specifically, the ferromagnetic metal powder includes powder having a metal content of not less than 50% by weight, 50% by weight or more of which is Fe. Specific examples of such ferromagnetic metal powders includes Fe—Co, Fe—Ni, Fe—Al, Fe—Ni—Al, Fe—Co—Ni, Fe—Ni—Al—Zn, and Fe—Al—Si. The acicular or spindle-shaped ferromagnetic metal powder preferably has a major axis length of 0.03 to 0.2 µm, particularly 0.05 to 0.10 µm, with an acicular ratio (major axis length/minor axis length) of 3 to 15, particularly 3 to 10, and a BET specific surface area of 30 to 70 $m^2/g$. The acicular or spindle-shaped ferromagnetic metal powder preferably has a coercive force (Hc) of 125 to 200 kA/m and a saturation magnetization (σs) of 119 to 167 $Am^2/kg$.

The ferromagnetic hexagonal ferrite powder includes fine tabular particles of barium ferrite or strontium ferrite, part of the Fe atoms of which may be displaced with Ti, Co, Ni, Zn, V or the like atoms. The ferromagnetic hexagonal ferrite powder preferably has a tabular diameter of 0.1 µm or less, particularly 10 to 90 nm, especially 10 to 40 nm, with an aspect ratio (diameter/thickness) of 2 to 7, particularly 2 to 5, and a BET specific surface area of 30 to 70 $m^2/g$. The ferromagnetic hexagonal ferrite powder preferably has a coercive force (Hc) of 135 to 260 kA/m and a saturation magnetization (σs) of 27 to 72 Am$^2$/kg, particularly 43 to 72 Am$^2$/kg.

The binder used in the magnetic layer 4 can be selected from those useful in the color-containing layer 5 or the backcoating layer 6. For the details, the descriptions given to the color-containing layer 5 and the backcoating layer 6 can be referred to. The binder is preferably used in an amount of 10 to 40 parts by weight, particularly 15 to 25 parts by weight, per 100 parts by weight of the ferromagnetic powder.

The magnetic layer 4 can contain abrasive grains, carbon black, lubricants, hardeners, etc. in addition to the magnetic powder and the binder.

Abrasive grains having a Mohs hardness of 7 or higher, such as alumina, silica, $ZrO_2$, and $Cr_2O_3$, are used for preference. From the standpoint of reduction in frictional coefficient and improvement in running durability, the abrasive grains preferably have a particle size of 0.03 to 0.6 μm, particularly 0.05 to 0.3 μm. The abrasive grains are preferably added in an amount of 2 to 20 parts by weight, particularly 3 to 15 parts by weight, per 100 parts by weight of the ferromagnetic powder.

The carbon black, lubricants and hardeners to be added to the magnetic layer 4 can be selected from those useful for the formation of the color-containing layer 5 or the backcoating layer 6. For the detail, the descriptions given thereto can be referred to here. The carbon black is preferably used in an amount of 0.1 to 10 parts by weight, particularly 0.1 to 5 parts by weight per 100 parts by weight of the ferromagnetic powder. The lubricant is preferably used in an amount of 0.5 to 10 parts by weight, particularly 0.5 to 5 parts by weight on the same basis. The hardener is preferably used in an amount of 2 to 30 parts by weight, particularly 5 to 20 parts by weight on the same basis.

The magnetic layer 4 can further contain various additives customarily used in conventional magnetic tape, such as dispersants, rust inhibitors, antifungal agents, and the like.

The magnetic layer 4 is provided by coating the intermediate layer 3 with a magnetic coating composition comprising the aforesaid components dispersed in a solvent. The solvent can be chosen from among those useful in the color-containing coating composition or the backcoating composition. The solvent is preferably used in an amount of 80 to 500 parts by weight, particularly 100 to 350 parts by weight, per 100 parts by weight of the ferromagnetic powder present in the magnetic coating composition.

The magnetic coating composition is prepared by, for example, preliminarily mixing the ferromagnetic powder and the binder together with a portion of the solvent in a Naughter mixer, etc., kneading the premixture in a continuous pressure kneader, a twin-screw extruder, etc., diluting the mixture with another portion of the solvent, followed by dispersing in a sand mill, etc., adding to the dispersion additives, such as a lubricant, filtering the dispersion, and adding thereto the remainder of the solvent and a hardener.

In order to manifest sufficient recording and reproducing characteristics, the magnetic layer 4 preferably has a coercive force of 119 to 280 kA/m (1495 to 3519 Oe), particularly 120 to 250 kA/m (1508 to 3141 Oe), especially 125 to 222 kA/m. The magnetic layer 4 preferably has a saturation flux density of 0.1 to 0.5 T, particularly 0.15 to 0.45 T.

For obtaining improved S/N ratio and for preventing self-demagnetization, the thickness of the magnetic layer 4 is preferably 0.01 to 1 μm, still preferably 0.05 to 0.8 μm, particularly preferably 0.05 to 0.3 μm.

The intermediate layer 3 may be either magnetic or nonmagnetic. The magnetic intermediate layer 3 is a layer containing magnetic powder, formed by using a magnetic coating composition mainly comprising magnetic powder, nonmagnetic powder, a binder, and a solvent. The nonmagnetic intermediate layer 3 is a layer formed by using a nonmagnetic coating composition mainly comprising nonmagnetic powder, a binder, and a solvent. The coating composition for the intermediate layer 3, either magnetic or nonmagnetic, will be inclusively referred to as an intermediate layer coating composition.

The magnetic powder is preferably ferromagnetic powder including hard magnetic powder and soft magnetic powder.

The hard magnetic powder includes the ferromagnetic hexagonal ferrite powder, ferromagnetic metal powder and ferromagnetic iron oxide powder which can be used in the magnetic layer 4. For the details of these magnetic powders, the descriptions given thereto with respect to the magnetic layer 4 can apply appropriately.

The nonmagnetic powder preferably includes particles of inorganic substances having a Mohs hardness less than 6. Examples of such nonmagnetic powder are nonmagnetic iron oxide (red oxide), titanium oxide, barium sulfate, zinc sulfide, magnesium carbonate, calcium carbonate, calcium oxide, zinc oxide, magnesium oxide, magnesium dioxide, tungsten disulfide, molybdenum disulfide, boron nitride, tin dioxide, silicon carbide, cerium oxide, corundum, artificial diamond, garnet, siliceous stone, silicon nitride, molybdenum carbide, boron carbide, tungsten carbide, titanium carbide, diatomaceous earth, dolomite, and resins. In particular, nonmagnetic iron oxide, titanium oxide, and boron nitride are preferred. These nonmagnetic powders can be used either individually or as a combination of two or more thereof. The nonmagnetic powder can have any of a spherical shape, a tabular shape and an acicular shape or may be amorphous. The spherical, tabular or amorphous powder preferably has a particle size of 5 to 200 nm, and the acicular powder preferably has a major axis length of 20 to 300 nm with an acicular ratio of 3 to 20. Where the nonmagnetic powder is used in combination with the magnetic powder, namely, where the intermediate layer 3 is magnetic, it is preferably used in an amount of 30 to 70 parts by weight, particularly 40 to 60 parts by weight, per 100 parts by weight of the magnetic powder. Where the intermediate layer 3 is nonmagnetic, containing no magnetic powder, the amounts of the other components are decided based on 100 parts by weight of the nonmagnetic powder.

The intermediate layer 3, either magnetic or nonmagnetic, contains a binder and, if desired, abrasive grains, lubricants, carbon black, hardeners, and the like in addition to the above-mentioned components. These components are the same as described with reference to the color-containing layer 5, backcoating layer 6 and magnetic layer 4. Preferred amounts of them are shown below, given in terms of parts by weight per 100 parts by weight of the total amount of the magnetic powder and the nonmagnetic powder (in the magnetic intermediate layer 3) or 100 parts by weight of the nonmagnetic powder (in the nonmagnetic intermediate layer 3).

| | |
|---|---|
| Binder: | 8 to 40, particularly 10 to 30 |
| Abrasive grains: | 1 to 30, particularly 1 to 12 |
| Lubricant: | 0.5 to 20, particularly 1 to 7 |
| Carbon black: | 0.5 to 30, particularly 2 to 10 |
| Hardener: | 0.5 to 12, particularly 2 to 8 |

If desired, the intermediate layer 3 can contain various additives as could be added to the magnetic layer 4.

The intermediate layer 3 is formed by coating the substrate 2 with an intermediate layer coating composition containing the aforesaid various components and a solvent.

The solvent useful in the intermediate layer coating composition are the same as those used in the color-containing coating composition, backcoating composition and magnetic coating composition. The solvent is preferably used in an amount of 100 to 700 parts by weight, particularly 300 to 500 parts by weight, per 100 parts by weight of the non-magnetic powder (in the nonmagnetic intermediate coating composition) or the total of the magnetic powder and the nonmagnetic powder (in the magnetic intermediate layer coating composition).

The intermediate layer 3 should have some thickness to assure the capacity of holding lubricants which is influential on the durability of the magnetic tape 1, but too large a thickness is liable to crack initiation when deflected. A suitable thickness is 0.1 to 3 µm, particularly 0.1 to 2 µm.

Where the intermediate layer 3 is magnetic, its coercive force preferably ranges from 80 to 350 kA/m, particularly 150 to 300 kA/m, from the standpoint of overwrite characteristics and the output balance over a low to high frequency region. Its saturation flux density is preferably 0.04 to 0.5 T, particularly 0.05 to 0.4 T, taking the output balance over a low to high region into consideration.

The substrate 2 can be made of any conventional materials known for magnetic tape, such as those described in Japanese Patent Laid-Open No. 35246/97, column 2, lines 30–42. Of the materials described, nonmagnetic materials such as polyethylene terephthalate (PET), polyethylene naphthalate (PEN), and polyamide are suited. The substrate 2 preferably has a thickness of 6 µm or smaller, particularly 5 µm or smaller, for achieving a high recording capacity. A layer for easy adhesion can be provided on the surface of the substrate 2 for improving adhesion to other layer.

The total thickness of the magnetic tape 1 is not greater than 7 µm, preferably from 4.5 to 6.8 µm. That is, the magnetic tape of the aforesaid embodiments is of extremely thin type. In general, stiffness of a magnetic tape decreases with reduction in thickness. It tends to follow that the contact of the magnetic tape with a magnetic head is reduced, which can result in a reduction of output. Where the magnetic tape 1 has a metallic thin layer 7, 8 or 9, which has high stiffness, the magnetic tape has high stiffness despite its small thickness. Therefore, the embodiments in which a metallic thin layer is provided are advantageous in that increase in recording capacity by reduction in total thickness can be accomplished without involving the problem of stiffness reduction.

A preferred method for producing the magnetic tape according to the present invention is described below taking for instance the magnetic tape 1 of the first embodiment. A magnetic coating composition for forming the magnetic layer 4 and an intermediate layer coating composition for forming the intermediate layer 3 are applied simultaneously to the substrate 2 in a wet-on-wet coating system to form coating layers corresponding to the magnetic layer 4 and the intermediate layer 3. That is, the magnetic layer 4 is preferably provided while the intermediate layer 3 is wet.

The coating layers are subjected to magnetic field orientation and dried, and the coated material is wound up. Thereafter, the coated material is calendered, and a color-containing composition is applied onto the back side of the substrate 2 to form the color-containing layer 5. Alternatively, formation of the intermediate layer 3 and the magnetic layer 4 may be preceded by formation of the color-containing layer 5. The coated material is aged at 40 to 80° C. for 6 to 100 hours and then slit to a prescribed width to obtain the magnetic tape 1. Before use of the magnetic tape 1, a prescribed color-changed pattern 10 providing servo signals is formed on the color-containing layer 5.

The above-mentioned simultaneous coating technique in a wet-on-wet coating system is described, e.g., in Japanese Patent Laid-Open No. 73883/93, column 42, line 31 to column 43, line 31. This is a technique in which the magnetic coating composition is applied before the intermediate layer coating composition dries. Where this technique is followed, there is obtained magnetic tape which causes few dropouts and can cope with high-density recording, the coating layers of which have excellent durability.

The magnetic field orientation treatment is carried out before each coating composition dries. The treatment can be performed by applying a magnetic field of about 40 kA/m or higher, preferably about 80 to 800 kA/m, in parallel with the side coated with the magnetic coating composition or passing the coated material through a solenoid type magnet of about 80 to 800 kA/m while the magnetic coating composition is wet. By this treatment under such conditions, the ferromagnetic powder in the magnetic layer 4 are orientated in the longitudinal direction of the tape 1. For the purpose of inhibiting the thus orientated ferromagnetic powder from changing its orientation during the subsequent drying step, it is a preferred manipulation to apply warm air at 30 to 50° C. from above the magnetic layer 4 immediately before the magnetic field orientation treatment, whereby the coated material is dried preliminarily to have a controlled residual solvent content in each layer.

The drying of the coating layers is carried out by, for example, supplying gas heated to 30 to 120° C. The degree of drying can be controlled by adjusting the temperature and the feed rate of the gas.

The calendering of the coated material is carried out by, for example, supercalendering comprising passing the coated film between two rolls, such as a combination of a metal roll and a cotton roll or a synthetic resin roll, or a pair of metal rolls. The calendering is preferably carried out, for example, at a temperature of 60 to 140° C. under a linear pressure of 1 to 5 kN/cm.

If desired, the surface of the magnetic layer 4 can be subjected to a finishing step, such as burnishing or cleaning. It is possible to apply the magnetic coating composition and the intermediate layer coating composition by a general successive coating technique.

While the magnetic tape of the present invention has been described by referring to its preferred embodiments, it should be understood that the present invention is not limited thereto, and various changes and modifications can be made therein without departing from the spirit and scope of the present invention.

For example, the magnetic tape 1 according to any of the embodiments shown in FIGS. 1, 6, 7, and 9 has a multilayer structure having a magnetic layer 4 and an intermediate layer 3 on a substrate 2, the present invention is also applicable to magnetic tape having no intermediate layer as shown in FIGS. 12 through 15.

While the magnetic tape 1 according to the embodiments shown in FIGS. 1, 6, 12, and 13 achieves servo control by making use of transmitted light, reflected light may be used for servo control as well by selecting the materials constituting the color-containing layer 5 or the backcoating layer 6 so as to have a proper reflectance or refractive index, etc.

The depressions 9' (servo tracking pattern) made in the metallic thin layer 9 of the fifth embodiment shown in FIG. 10 can be replaced with a pattern printed on the backcoating layer 6 by various printing or coating methods such as gravure coating or ink jet printing. In this modification servo tracking control is carried out by utilizing the difference in optical properties between the printed pattern and the other region of the side of the non-recording surface.

Further, the servo tracking pattern in the foregoing embodiments can be a combination of (a) one or more than one lines having a prescribed width continuously extending in the longitudinal direction of the magnetic tape 1 and (b) discontinuous lines having a prescribed width arranged along the longitudinal direction of the tape 1. The servo tracking pattern may be composed of dots arranged in a line or a curve or a combination thereof. In particular, a pattern composed of a continuous straight line(s) is advantageous for ease of formation.

The servo tracking pattern can also be composed of dots (circles, rectangles, triangles, crosses, etc.) or combinations thereof.

The magnetic tape 1 shown in FIG. 1 or 6 can have a primer layer between the substrate 2 and the intermediate layer 3 or the color-containing layer 5.

While the magnetic tape according to the above-described embodiments is of coated type, the effects of the present invention can be produced equally when the present invention is applied to magnetic tape of metal-deposited type.

The magnetic tape according to the present invention is suitable as audio visual recording tapes such as a DVC tape, an 8-mm video tape, and a DAT tape, and data storage tapes such as a DLT tape, a DDS tape, a ¼ in. data cartridge tape, and a data 8-mm tape.

The present invention will now be illustrated in greater detail by way of Examples in view of Comparative Examples for better understanding and for demonstrating its effectiveness, but it should be understood that the present invention is not construed as being limited thereto. In Examples and Comparative Examples, the viscosity of the color-containing coating composition prepared was measured with a Brookfield type viscometer at 100 rpm. The viscosity of each color-containing coating composition was adjusted by increasing or decreasing the amount of the solvent so as to fall within a range of ±30% of that of the color-containing coating composition prepared in Example I-1 taken as a standard. Unless otherwise noted, all the parts and percents are given by weight.

EXAMPLE I-1

The following components except the hardener were kneaded in a kneader, dispersed in a stirrer, and further finely dispersed in a sand mill. The dispersion was filtered through a 1 µm filer, and finally, the hardener was added thereto to prepare a color-containing coating composition, a magnetic coating composition, and an intermediate layer coating composition having the respective formulations described below.

| Formulation of Color-Containing Coating Composition: | |
|---|---|
| ITO (average particle size: 35 nm) | 100 parts |
| Silicone particles (average particle size: 0.5 µm; "TOSPEARL 105", produced by TOSHIBA SILICONE Co., Ltd.) | 3 parts |
| Phosphoric ester (lubricant; "PHOSPHANOL RE610", produced by TOHO CHEMICAL INDUSTRY Co., Ltd.) | 3 parts |
| 3,3'-Dipropylthiadicarbocyanine iodide (coloring matter) | 0.3 part |
| Polyurethane resin (binder; number average molecular weight: 25,000; sulfoxyl group content: $1.2 \times 10^{-4}$ mol/g; Tg: 45° C.) | 28 parts |
| Stearic acid (lubricant) | 0.5 part |

| -continued | |
|---|---|
| Formulation of Color-Containing Coating Composition: | |
| Polyisocyanate (hardener; "CORPMATE L", produced by NIPPON POLYURETHANE INDUSTRY Co., Ltd.; solid content: 75%) | 4 parts |
| Methyl ethyl ketone (solvent; hereinafter abbreviated as MEK) | 120 parts |
| Toluene (solvent) | 80 parts |
| Cyclohexanone (solvent) | 40 parts |

| Formulation of Magnetic Coating Composition: | |
|---|---|
| Acicular ferromagnetic metal powder consisting mainly of Fe (Fe:Co:Al:Y:Ba = 70:25:2:2:1 (by weight); major axis length: 0.07 µm; acicular ratio: 5; BET specific surface area: 56 m²/g; X-ray particle size: 0.014 µm; coercive force: 160 kA/m (2010 Oe); saturation magnetization: 142 Am²/kg) | 100 parts |
| Alumina (abrasive; average primary particle size: 0.15 µm) | 8 parts |
| Carbon black (average primary particle size: 0.018 µm) | 0.5 parts |
| Vinyl chloride copolymer (binder; average degree of polymerization: 280; epoxy content: 1.2%; sulfoxyl content: $8 \times 10^{-5}$ mol/g) | 10 parts |
| Polyurethane resin (binder; number average molecular weight: 25000; sulfoxyl content: $1.2 \times 10^{-4}$ mol/g; Tg: 45° C.) | 7 parts |
| Stearic acid (lubricant) | 1.5 parts |
| 2-Ethylhexyl oleate (lubricant) | 2 parts |
| Polyisocyanate (hardener; "CORONATEL", produced by NIPPON POLYURETHANE INDUSTRY Co., Ltd.; solids content: 75%) | 5 parts |
| MEK (solvent) | 120 parts |
| Toluene (solvent) | 80 parts |
| Cyclohexanone (solvent) | 40 parts |

| Formulation of Intermediate Layer Coating Composition: | |
|---|---|
| Acicular α-Fe₂O₃ (average particle size (major axis length): 0.12 µm; acicular ratio: 10; BET specific surface area: 48 m²/g) | 100 parts |
| Alumina (abrasive; average primary particle size: 0.15 µm) | 3 parts |
| Vinyl chloride copolymer (binder; average degree of polymerization: 280; epoxy content: 1.2%; sulfoxyl content: $8 \times 10^{-5}$ mol/g) | 12 parts |
| Polyurethane resin (binder; number average molecular weight: 25000; sulfoxyl content: $1.2 \times 10^{-4}$ mol/g; Tg: 45° C.) | 8 parts |
| Stearic acid (lubricant) | 1 part |
| 2-Ethylhexyl oleate (lubricant) | 4 parts |
| Polyisocyanate (hardener; "CORONATE L", produced by NIPPON POLYURETHANE INDUSTRY Co., Ltd.; solids content: 75%) | 4 parts |
| MEK (solvent) | 90 parts |
| Toluene (solvent) | 60 parts |
| Cyclohexanone (solvent) | 30 parts |

The intermediate layer coating composition and the magnetic coating composition were applied simultaneously onto a 4.5 µm thick PEN film by means of a die coater to form the respective coating layers having a dry thickness of 1.5 µm and 0.2 µm, respectively. The coated film was passed through a solenoid type magnet of 400 kA/m while wet and dried in a drying oven by applying hot air at 80° C. at a rate of 10 m/min. The coated film was then calendered to form an intermediate layer and a magnetic layer. The reverse side of the substrate was coated with the color-containing coating composition and dried at 90° C. to form a color-containing layer having a thickness of 1.0 μm. The coated film was slit into strips of 12.7 mm in width to obtain a magnetic tape having the layer structure shown in FIG. 1. The resulting magnetic tape had a coercive force of 165 kA/m (2073 Oe), a saturation flux density of 0.37 T, and a squareness ratio of 0.86. The surface of the magnetic layer had an arithmetic mean roughness Ra of 4.3 nm and a 10 point height parameter Rz of 41 nm.

As shown in FIG. 2, the color-containing layer of the resulting magnetic tape was irradiated with laser beams each having a diameter of 2 μm, a wavelength of 1020 nm, and an output power of 50 mW to form a color-changed pattern affording servo signals which was comprised of parallel straight lines extending in the longitudinal direction and equally spaced in the width direction of the magnetic tape.

EXAMPLE I-2

A magnetic tape was obtained in the same manner as in Example I-1, except for changing the amounts of ITO and the coloring matter in the color-containing coating composition to 70 parts and 0.6 part, respectively, and adding 30 parts of spherical magnetite particles having an average particle size of 80 nm to the color-containing coating composition. A color-changed pattern was formed on the color-containing layer in the same manner as in Example I-1.

EXAMPLE I-3

A magnetic tape was obtained in the same manner as in Example I-1, except that the silicone particles were not used in the color-containing layer. A color-changed pattern was formed on the color-containing layer in the same manner as in Example I-1.

EXAMPLE I-4

A magnetic tape was obtained in the same manner as in Example I-1, except that the coloring matter used in the color-containing coating composition was replaced with Crystal Violet. A color-changed pattern was formed on the color-containing layer in the same manner as in Example I-1.

EXAMPLE I-5

A magnetic tape was obtained in the same manner as in Example I-1, except that the coloring matter used in the color-containing coating composition was replaced with Thionine. A color-changed pattern was formed on the color-containing layer in the same manner as in Example I-1.

EXAMPLE I-6

A magnetic tape was obtained in the same manner as in Example I-1, except for changing the amount of ITO in the color-containing coating composition to 50 parts and adding 50 parts of $TiO_2$ particles having an average particle size of 30 nm to the color-containing coating composition. A color-changed pattern was formed on the color-containing layer in the same manner as in Example I-1.

EXAMPLE I-7

A magnetic tape was obtained in the same manner as in Example I-1, except for changing the amount of the silicone particles used in the color-containing coating composition to 6 parts. A color-changed pattern was formed on the color-containing layer in the same manner as in Example I-1.

EXAMPLE I-8

A magnetic tape was obtained in the same manner as in Example I-1, except for changing the amount of ITO in the color-containing coating composition to 10 parts and adding 90 parts of spherical particles of $\alpha\text{-}Fe_2O_3$ having an average particle size of 20 nm to the color-containing coating composition. A color-changed pattern was formed on the color-containing layer in the same manner as in Example I-1.

COMPARATIVE EXAMPLE I-1

A magnetic tape was obtained in the same manner as in Example I-1, except for using no coloring matter in the color-containing coating composition.

COMPARATIVE EXAMPLE I-2

A magnetic tape was obtained in the same manner as in Example I-1, except for replacing the color-containing coating composition with a backcoating composition having the following formulation.

| Formulation of Backcoating Composition: | |
|---|---|
| Carbon black (antistatic agent; average primary particle size: 0.018 μm) | 40 parts |
| NIPPORAN 2301 (binder; polyurethane produced by NIPPON POLYURETHANE INDUSTRY Co., Ltd.; solids content: 40%) | 50 parts |
| Polyisocyanate (hardener; "CORONATE L", produced by NIPPON POLYURETHANE INDUSTRY Co., Ltd.; solids content: 75%) | 4 parts |
| Nitrocellulose | 20 parts |
| Stearic acid (lubricant) | 1 part |
| MEK (solvent) | 140 parts |
| Toluene (solvent) | 140 parts |
| Cyclohexanone (solvent) | 140 parts |

In order to evaluate the performance of the magnetic tapes obtained in Examples and Comparative Examples, the reproduction output and light transmission of the magnetic tape and the coefficient of dynamic friction, surface resistivity, and color changeability of the color-containing layer were measured as follows. Further, a servo tracking test was carried out on the magnetic tapes in accordance with the following test method. The results obtained are shown in Table 1 below.

1) Reproduction Output

Signals having a recording wavelength of 0.6 μm were recorded, and the reproduction output was measured in accordance with a head tester method. The results obtained were expressed relatively taking the output of Comparative Example 1 as a standard (0 dB).

2) Light Transmission

The magnetic tape was irradiated with monochromatic light having the wavelength used for servo signal reading, and the percent light transmission in terms of the ratio of transmitted light intensity to incident light intensity was obtained. The values shown in Table 1 are transmissions measured before the color-changed pattern giving the servo information is formed on the color-containing layer.

3) Coefficient of Dynamic Friction

The magnetic tape was run on a tape running tester TBT-300D manufactured by YOKOHAAMA SYSTEM KENKYUSHO K.K. at a speed of 3.36 cm/sec with its color-containing layer in contact with a cylinder having a diameter of 5 mm at 180°. The tensions on the reel-off side and the reel-up side were measured to obtain a frictional coefficient ($\mu$) from equation (iii):

$$\mu = \frac{1}{\pi} \ln \frac{\text{reel-off tension}}{\text{reel-up tension}} \quad \text{(iii)}$$

4) Surface Resistivity

A pair of electrodes plated with 24-carat gold and finished to have a surface roughness of N4 (see ISO 1302) and having a radius of 10 mm were put in parallel horizontally on the color-containing layer of a test piece of the magnetic tape with a center-to-center distance d=12.7 mm. A direct voltage of 100 V±10 V was passed through the electrodes while applying a force of 0.25 N to both ends of the test piece, and the current between the electrodes was measured, from which the surface resistivity was obtained.

5) Color Change

The color-containing layer of the magnetic tape was irradiated with a laser beam, and the irradiated part was observed under an optical microscope to confirm discoloration.

6) Servo Tracking Test

Signals were recorded on the magnetic layer of the magnetic tape while carrying out servo tracking in accordance with push-pull method using transmitted light to evaluate the track controllability. The servo signals were detected with light having the same wavelength as that used for the above measurement of light transmission. Detection was performed by converting the difference in light transmission between a discolored part and a non-discolored part of the color-containing layer into electrical signals.

Further, the recorded signals were reproduced to measure the outputs by a head tester method and to measure the envelope characteristics. The outputs were expressed relatively taking the result of Example 1 as a standard (0 dB). The envelope characteristics were graded based on the following standard.

A . . . The output level was constant over the whole length of a track, depicting a uniform envelope.

B . . . The output level decreased in some parts in the former half or the latter half of a track, displaying a distorted envelope.

TABLE 1

| | | Magnetic Tape | | Color-Containing Layer | | | Servo Tracking Test | | |
| --- | --- | --- | --- | --- | --- | --- | --- | --- | --- |
| | | | Servo Signal Detection | Dynamic | Surface | | | | |
| | | Reproduction Output (dB) | Wavelength (nm) | Transmission (%) | Frictional Coefficient | Resistivity ($\Omega/\square$) | Color Change | Controllability | Reproduction Output (dB) | Envelope |
| Example | I-1 | +0.2 | 650 | 16 | 0.23 | $3.4 \times 10^7$ | observed | controllable | 0 (reference) | A |
| | I-2 | +0.4 | 650 | 8 | 0.19 | $8.3 \times 10^7$ | observed | controllable | −0.4 | B |
| | I-3 | +0.2 | 650 | 16 | 0.42 | $3.6 \times 10^7$ | observed | controllable | −0.5 | B |
| | I-4 | +0.2 | 635 | 14 | 0.21 | $2.8 \times 10^7$ | observed | controllable | +0.1 | A |
| | I-5 | +0.4 | 650 | 12 | 0.22 | $5.2 \times 10^7$ | observed | controllable | −0.2 | A |
| | I-6 | +0.2 | 650 | 18 | 0.20 | $1.8 \times 10^8$ | observed | controllable | +0.2 | A |
| | I-7 | +0.1 | 650 | 16 | 0.12 | $6.6 \times 10^7$ | observed | controllable | +0.3 | A |
| | I-8 | +0.3 | 650 | 17 | 0.18 | $7.5 \times 10^{11}$ | observed | controllable | −0.2 | B |
| Compara. Example | I-1 | 0 (reference) | 650 | 21 | 0.21 | $3.8 \times 10^7$ | not observed | uncontrollable | — | — |
| | I-2 | +0.2 | 650 | 0.4 | 0.18 | $5.1 \times 10^5$ | not observed | uncontrollable | — | — |

As is apparent from the results in Table 1, the magnetic tapes according to the present invention prepared in Examples I-1 to I-8 provide high reproduction outputs and achieve satisfactory servo control. In particular, the magnetic tapes of Examples achieved reliable servo control even when the tapes were recorded on 600 data tracks. Further, the magnetic tapes of Examples had a low dynamic frictional coefficient and a low surface resistivity, proving that the color-containing layer also functions as a backcoating layer. While not shown in Table 1, the color-containing layer of the magnetic tapes of Examples was equal to a backcoating layer of ordinary magnetic tapes in arithmetic mean roughness and 10 point height parameter.

EXAMPLE II-1

The following components except the hardener were kneaded in a kneader, dispersed in a stirrer, and further finely dispersed in a sand mill. The dispersion was filtered through a 1 μm filer, and finally, the hardener was added thereto to prepare a color-containing coating composition, a magnetic coating composition, and an intermediate layer coating composition having the respective compositions described below.

| Formulation of Color-Containing Coating Composition: | |
| --- | --- |
| ITO (average particle size: 35 nm) | 100 parts |
| Silicone particles (average particle size: 0.5 μm; "TOPSPEARL 105", produced by TOSHIBA SILICONE Co., Ltd.) | 3 parts |
| Phosphoric ester (lubricant; "PHOSPHANOL RE610", produced by TOHO CHEMICAL INDUSTRY Co., Ltd.) | 3 parts |
| 3,3'-Dipropylthiadicarbocyanine iodide (coloring-matter) | 0.2 part |

-continued

Formulation of Color-Containing Coating Composition:

| | |
|---|---|
| Polyurethane resin (binder; number average molecular weight: 25,000; sulfoxyl group content: $1.2 \times 10^{-4}$ mol/g; Tg: 45° C.) | 28 parts |
| Stearic acid (lubricant) | 0.5 part |
| Polyisocyanate (hardener; "CORONATE L", produced by NIPPON POLYURETHANE INDUSTRY Co., Ltd.; solids content: 75%) | 4 parts |
| MEK (solvent) | 120 parts |
| Toluene (solvent) | 80 parts |
| Cyclohexanone (solvent) | 40 parts |

Formulation of Magnetic Coating Composition:

| | |
|---|---|
| Acicular ferromagnetic metal powder consisting mainly of Fe (Fe:Co:Al:Y:Ba = 83:10:4:2:1 (by weight); major axis length: 0.09 μm; acicular ratio: 7; BET specific surface area: 56 m$^2$/g; X-ray particle size: 0.013 μm; coercive force: 145 kA/m (1822 Oe); saturation magnetization: 145 Am$^2$/kg) | 100 parts |
| Alumina (abrasive; average particle size: 0.15 μm) | 9 parts |
| Carbon black (average primary particle size: 0.05 μm) | 0.3 part |
| Vinyl chloride copolymer (binder; average degree of polymerization: 280; epoxy content: 1.2%; sulfoxyl content: $8 \times 10^{-5}$ mol/g) | 6 parts |
| Polyurethane resin (binder; number average molecular weight: 25000; sulfoxyl content: $1.2 \times 10^{-4}$ mol/g; Tg: 45° C.) | 7 parts |
| Stearic acid (lubricant) | 1 part |
| 2-Ethylhexyl stearate (lubricant) | 2 parts |
| Polyisocyanate (hardener; "CORONATE L", produced by NIPPON POLYURETHANE INDUSTRY Co., Ltd.) | 4 parts |
| MEK (solvent) | 120 parts |
| Toluene (solvent) | 80 parts |
| Cyclohexanone (solvent) | 40 parts |

Formulation of Intermediate Layer Coating Composition:

| | |
|---|---|
| Acicular α-Fe$_2$O$_3$ (average particle size (major axis length): 0.12 μm; acicular ratio: 10; BET specific surface area: 48 m$^2$/g) | 100 parts |
| Alumina (abrasive; average primary particle size: 0.15 μm) | 3 parts |
| Vinyl chloride copolymer (binder; average degree of polymerization: 280; epoxy content: 1.2%; sulfoxyl content: $8 \times 10^{-5}$ mol/g) | 12 parts |
| Polyurethane resin (binder; number average molecular weight: 25000; sulfoxyl content: $1.2 \times 10^{-4}$ mol/g; Tg: 45° C.) | 8 parts |
| Stearic acid (lubricant) | 1 part |
| 2-Ethylhexyl oleate (lubricant) | 4 parts |
| Polyisocyanate (hardener; "CORONATE L", produced by NIPPON POLYURETHANE INDUSTRY Co., Ltd.) | 4 parts |
| MEK (solvent) | 90 parts |
| Toluene (solvent) | 60 parts |
| Cyclohexanone (solvent) | 30 parts |

A thin film of Au was deposited on both sides of a 4.5 μm thick PEN film by vacuum thin film processing to a deposit thickness of 0.05 μm/side to prepare a substrate. The intermediate layer coating composition and the magnetic coating composition were applied simultaneously onto one of the metallic thin films by means of a die coater to form the respective coating layers having a dry thickness of 1.5 μm and 0.2 μm, respectively. The coated film was passed through a solenoid type magnet of 400 kA/m while wet and dried in a drying oven by applying hot air at 80° C. at a rate of 10 m/min. The coated film was then calendered to form an intermediate layer and a magnetic layer. The other metallic thin film of the substrate was coated with the color-containing coating composition and dried at 90° C. to form a color-containing layer having a thickness of 1.0 82 m. The coated film was slit into strips of 12.7 mm in width to obtain a magnetic tape having the layer structure shown in FIG. 7. The resulting magnetic tape had a coercive force of 151 kA/m (1898 Oe), a saturation flux density of 0.36 T, and a squareness ratio of 0.90. The surface of the magnetic layer had an arithmetic mean roughness Ra of 4.6 nm and a 10 point height parameter Rz of 55 nm.

The color-containing layer of the resulting magnetic tape was irradiated with laser beams each having a diameter of 2 μm, a wavelength of 1020 nm, and an output power of 50 mW to form a color-changed pattern affording servo signals which comprised parallel straight lines extending in the longitudinal direction and equally spaced in the width direction of the tape.

EXAMPLE II-2

A magnetic tape was obtained in the same manner as in Example II-1, except that the silicone particles were not used in the color-containing layer. A color-change pattern was formed on the color-containing layer in the same manner as in Example II-1.

EXAMPLE II-3

A magnetic tape was obtained in the same manner as in Example II-1, except that the coloring matter used in the color-containing coating composition was replaced with Crystal Violet. A color-changed pattern was formed on the color-containing layer in the same manner as in Example II-1.

EXAMPLE II-4

A magnetic tape was obtained in the same manner as in Example II-1, except that the coloring matter used in the color-containing coating composition was replaced with Thionine. A color-changed pattern was formed on the color-containing layer in the same manner as in Example II-1.

EXAMPLE II-5

A magnetic tape was obtained in the same manner as in Example II-1, except for changing the amount of ITO in the color-containing coating composition to 80 parts and adding 20 parts of TiO$_2$ particles having an average particle size of 40 nm to the color-containing coating composition. A color-changed pattern was formed on the color-containing layer in the same manner as in Example II-1.

EXAMPLE II-6

A magnetic tape was obtained in the same manner as in Example II-1, except for changing the amount of the silicone particles used in the color-containing coating composition to 6 parts. A color-changed pattern was formed on the color-containing layer in the same manner as in Example II-1.

EXAMPLE II-7

A magnetic tape was obtained in the same manner as in Example II-1 with the following exceptions. A metallic thin layer of Al having a thickness of 0.03 μm was formed on the PEN film by vacuum deposition, and a metallic thin layer 8 was not formed. The metallic thin layer 7 was coated with a color-containing coating composition and a backcoating composition having the following respective formulations simultaneously in a wet-on-wet system in this order to form a color-containing layer having a thickness of 0.15 μm and a backcoating layer having a thickness of 0.35 μm as an outermost layer. The color-containing layer of the resulting magnetic tape was irradiated with laser beams each having a diameter of 3 μm, a wavelength of 680 nm, and an output power of 20 mW to form a color-changed pattern similar to that of Example II-1.

| Formulation of Color-Containing Composition | |
|---|---|
| ITO (average particle size: 35 nm) | 100 parts |
| Cyanine dye (formula (1) wherein $R_1$ and $R_2$ are each $C_4H_9$; n is 2; and $X^-$ is a perchlorate ion) | 6 parts |
| Polyurethane resin (binder; number average molecular weight: 25,000; sulfoxyl group content: $1.2 \times 10^{-4}$ mol/g; Tg: 45° C.) | 28 parts |
| Polyisocyanate (hardener; "CORONATE L", produced by NIPPON POLYURETHANE INDUSTRY Co., Ltd.; solids content: 75%) | 4 parts |
| MEK (solvent) | 120 parts |
| Toluene (solvent) | 80 parts |
| Cyclohexanone (solvent) | 40 parts |

| Formulation of Backcoating Composition | |
|---|---|
| ITO (average particle size: 35 nm) | 100 parts |
| Silicone resin (average particle size: 0.5 μm; TOSPEARL 105, produced by TOSHIBA SILICONE Co., Ltd.) | 1 part |
| Phosphoric ester (lubricant; "Phosphanol RE610", produced by Toho Chemical Industry Co., Ltd.) | 3 parts |
| Polyurethane resin (binder; number average molecular weight: 25,000; sulfoxyl group content: $1.2 \times 10^{-4}$ mol/g; Tg: 45° C.) | 28 parts |
| Stearic acid (lubricant) | 0.5 part |
| Polyisocyanate (hardener; "CORONATE L", produced by NIPPON POLYURETHANE INDUSTRY Co., Ltd.; solids content: 75%) | 4 parts |
| MEK (solvent) | 120 parts |
| Toluene (solvent) | 80 parts |
| Cyclohexanone (solvent) | 40 parts |

COMPARATIVE EXAMPLE II-1

A magnetic tape was obtained in the same manner as in Example II-1, except for excluding the dye from the color-containing coating composition.

COMPARATIVE EXAMPLE II-2

A magnetic tape was obtained in the same manner as in Example II-1, except for replacing the color-containing coating composition used in Example II-1 with a backcoating composition having the following formulation.

| Formulation of Backcoating Composition | |
|---|---|
| Carbon black (antistatic agent; average primary particle size: 0.018 μm) | 40 parts |
| NIPPON 2301 (binder; polyurethane produced by NIPPON POLYURETHANE INDUSTRY Co., Ltd.; solid content: 40%) | 50 parts |
| Polyisocyanate (hardener; "CORONATE L", produced by NIPPON POLYURETHANE INDUSTRY Co., Ltd.; solids content: 75%) | 4 parts |
| Nitrocellulose | 20 parts |
| Stearic acid (lubricant) | 1 part |
| MEK (solvent) | 140 parts |
| Toluene (solvent) | 140 parts |
| Cyclohexanone (solvent) | 140 parts |

The performance of the magnetic tapes prepared in Examples II-1 to II-7 and Comparative Examples II-1 to II-2 was evaluated in terms of reproduction output of the magnetic tape, coefficient of dynamic friction and surface resistivity of the color-containing layer, and color changeability of the color-containing layer in the same manner as described above. Further, the magnetic tapes were subjected to the servo tracking test. Additionally, the light reflectance of the color-containing layer side was measured as follows. The results obtained are shown in Table 2 below.

Light Reflectance:

The color-containing layer side of the magnetic tape was irradiated with monochromatic light of the wavelength used for serve signal reading to obtain a percent light reflectance in terms of the ratio of reflected light intensity to incident light intensity. The values shown in Table 2 are reflectances measured before the color-changed pattern giving the servo information was formed on the color-containing layer.

TABLE 2

| | | Magnetic Tape | | | Color-containing Layer | | | | Servo Tracking Test | |
|---|---|---|---|---|---|---|---|---|---|---|
| | | | Servo Signal Detection | | Dynamic | Surface | | | | |
| | | Reproduction Output (dB) | Wavelength (nm) | Reflectance (%) | Frictional Coefficient | Resistivity ($\Omega/\square$) | Color Change | Controllability | Reproduction Output (dB) | Envelope |
| Example | II-1 | +0.1 | 650 | 35 | 0.20 | $<1 \times 10^4$ | observed | controllable | 0 (reference) | A |
| | II-2 | +0.0 | 650 | 36 | 0.43 | $<1 \times 10^4$ | observed | controllable | −0.4 | B |
| | II-3 | +0.2 | 635 | 32 | 0.19 | $<1 \times 10^4$ | observed | controllable | +0.2 | A |
| | II-4 | +0.3 | 650 | 31 | 0.16 | $<1 \times 10^4$ | observed | controllable | −0.1 | A |

TABLE 2-continued

|  |  | Magnetic Tape | | Color-containing Layer | | | Servo Tracking Test | | |
|---|---|---|---|---|---|---|---|---|---|
|  |  | Servo Signal Detection | | Dynamic | Surface | | | | |
|  |  | Reproduction Output (dB) | Wavelength (nm) | Reflectance (%) | Frictional Coefficient | Resistivity ($\Omega/\square$) | Color Change | Controllability | Reproduction Output (dB) | Envelope |
|  | II-5 | +0.3 | 650 | 27 | 0.18 | $<1 \times 10^4$ | observed | controllable | +0.2 | A |
|  | II-6 | +0.1 | 650 | 31 | 0.11 | $<1 \times 10^4$ | observed | controllable | -0.2 | B |
|  | II-7* | +0.3 | 680 | 38 | 0.18 | $<1 \times 10^4$ | observed | controllable | +0.3 | A |
| Compara. Example | II-1 | 0 (reference) | 650 | 42 | 0.22 | $<1 \times 10^4$ | not observed | uncontrollable | — | — |
|  | II-2 | -0.1 | 650 | <0.1 | 0.17 | $<1 \times 10^4$ | not observed | uncontrollable | — | — |

Note:
*The dynamic frictional coefficient and surface resistivity were measured on the backcoating layer.

As is apparent from the results in Table 2, the magnetic tapes according to the present invention prepared in Examples II-1 to II-7 provide high reproduction outputs and achieve satisfactory servo control similarly to those of Examples I-1 to I-8. In particular, it was confirmed that the magnetic tapes of Examples II-1 to II-7 achieved reliable servo control even when the tapes were recorded on 600 tracks. Further, the magnetic tapes of Examples II-1 to II-6 had a low dynamic frictional coefficient and a low surface resistivity, proving that the color-containing layer sufficiently performs the functions as a backcoating layer. While not shown in Table 2, the color-containing layer of the magnetic tapes of Examples II-1 to II-6 and the backcoating layer of the magnetic tape of Example II-7 were equal to a backcoating layer of ordinary magnetic tapes in arithmetic mean roughness and 10 point height parameter.

EXAMPLE III-1

The following components except the hardener were kneaded in a kneader, dispersed in a stirrer, and further finely dispersed in a sand mill. The dispersion was filtered through a 1 μm filer, and finally, the hardener was added thereto to prepare a backcoating composition A, a magnetic coating composition, and an intermediate layer coating composition having the respective compositions described below.

| Formulation of Backcoating Composition A | |
|---|---|
| Acicular α-Fe$_2$O$_3$ (major axis length: 0.12 μm) | 100 parts |
| Silicone resin particles (average particle size: 0.5 μm) | 3 parts |
| Phosphoric ester (lubricant) | 3 parts |
| Sulfoxyl-containing polyurethane resin (binder) | 28 parts |
| Stearic acid (lubricant) | 0.5 part |
| Polyisocyanate compound (hardener; solids content: 75%) | 4 parts |
| MEK (solvent) | 120 parts |
| Toluene (solvent) | 80 parts |
| Cyclohexanone (solvent) | 40 parts |

| Formulation of Magnetic Coating Composition | |
|---|---|
| Acicular ferromagnetic metal powder consisting mainly of iron (major axis length: 80 nm; coercive force: 183 kA/m; saturation magnetization: 145 Am$^2$/g; BET specific surface area: 55 m$^2$/g) | 100 parts |
| Sulfoxyl-containing vinyl chloride copolymer (binder) | 10 parts |
| Sulfoxyl-containing polyurethane resin (binder) | 10 parts |
| Carbon black (average particle size: 30 nm) | 0.5 part |
| α-Alumina (abrasive; average particle size: 200 nm) | 10 parts |
| Myristic acid (lubricant) | 2 parts |
| Butyl stearate (lubricant) | 0.5 part |
| Isocyanate compound (hardener; solids content: 75%) | 2 parts |
| MEK (solvent) | 250 parts |
| Cyclohexanone (solvent) | 100 parts |

| Formulation of Intermediate Layer Coating Composition | |
|---|---|
| Acicular α-Fe$_2$O$_3$ (major axis length: 150 nm) | 100 parts |
| Sulfoxyl-containing vinyl chloride copolymer (binder) | 10 parts |
| Sulfoxyl-containing polyurethane resin (binder) | 15 parts |
| α-Alumina (abrasive; average particle size: 200 nm) | 3 parts |
| Carbon black (average particle size: 20 nm) | 5 parts |
| Myristic acid (lubricant) | 2 parts |
| Butyl stearate (lubricant) | 2 parts |
| Isocyanate compound (hardener; solids content: 75%) | 5 parts |
| MEK (solvent) | 150 parts |
| Cyclohexanone (solvent) | 50 parts |

Indium was deposited on one side of a 4.5 μm thick PET film as a substrate 2 by vacuum evaporation to a deposit thickness of 20 nm to form a metallic thin layer 9. The backcoating composition A was applied to the metallic thin layer 9 and dried at 90° C. to form a backcoating layer 6 having a thickness of 0.5 μm. On the opposite side of the substrate 2 were applied the intermediate coating composition and the magnetic coating composition simultaneously by means of a die coater to form the respective coating layers having a dry thickness of 1.5 μm and 0.2 μm, respectively. The coated film was passed through a solenoid type magnet of 400 kA/m while wet and dried in a drying oven by applying hot air at 80° C. at a rate of 10 m/min. The coated film was then calendered to form an intermediate layer 3 and a magnetic layer 4. The coated film was slit into strips of 12.7 mm in width to obtain a magnetic tape. A laser beam having a diameter of 1 μm, a wavelength of 780 nm, and an output power of 4 mW was intermittently cast on the backcoating layer side of the magnetic tape. The irradiated indium of the metallic thin layer 9 fused to form depressions 9' (servo tracking pattern) 1 μm wide, 2 μm long and 20 nm deep at regular intervals in the longitudinal direction of the tape as shown in FIG. 11. The distance between adjacent depressions 9' was 2 μm.

EXAMPLE III-2

A magnetic tape was obtained in the same manner as in Example III-1, except for replacing the backcoating composition A with a backcoating composition B having the following formulation.

| Formulation of Backcoating Composition B | |
|---|---|
| Carbon black (average particle size: 18 nm) | 5 parts |
| Mn-hematite (average particle size: 100 nm) | 25 parts |
| Polyurethane resin (binder) | 50 parts |
| Nitrocellulose (binder) | 30 parts |
| Isocyanate compound (hardener; solids content: 75%) | 18 parts |
| Copper phthalocyanine | 5 parts |
| Stearic acid (lubricant) | 1 part |
| MEK (solvent) | 150 parts |
| Toluene (solvent) | 150 parts |
| Cyclohexanone (solvent) | 150 parts |

Signals were recorded on the magnetic layer of the magnetic tape obtained in Examples III-1 and 2 while carrying out servo tracking in accordance with push-pull method. For servo signal reading, the backcoating layer was irradiated with light having a wavelength of 780 nm, and the reflected light intensity was detected. As a result, the magnetic tapes achieved reliable servo control even when the tapes were recorded on 600 tracks as shown in Table 3 below. In particular, the magnetic tape of Example III-1, in which the backcoating layer did not contain carbon black, showed a higher reflectance on its backcoating layer side, making the servo control more reliable. After each magnetic tape was stored for 3 months as wound around a reel, the surface condition of the magnetic layer 4 was observed. As shown in Table 3, it was confirmed that the surface condition was maintained on the level before storage, proving that a change in surface condition, if any, of the backcoating layer 6 which might be caused by the depressions 9' was not transferred onto the magnetic layer 4 during storage. Additionally, while not shown in Table 3, each tape was proved to maintain the performance in terms of reproduction output and dropout ratio on the level of ordinary magnetic tapes.

TABLE 3

| Example No. | Track Controlla-bility | Adverse Influence on Magnetic Layer | Reflectance (%) | | Difference of Reflectance (%) |
|---|---|---|---|---|---|
| | | | Pattern | Other Region | |
| III-1 | good | none | 5 | 30 | 83 |
| III-2 | acceptable | none | 3 | 10 | 70 |

This application claims the priority of Japanese Patent Application No. 9-337733 filed Nov. 21, 1997, Japanese Patent Application No. 10-190867 filed Jul. 6, 1998 and Japanese Patent Application No. 10-215432 filed Jul. 30, 1998, which are incorporated herein by reference.

The invention claimed is:

1. A magnetic tape comprising a substrate having on one side thereof a magnetic layer serving as a recording surface and on the other side thereof a resin layer ,serving as a non-recording surface, wherein said magnetic tape has a region on the side of the non-recording surface along the longitudinal direction of the tape in which a regular pattern for servo tracking having different optical properties from the other major region of the side of the non-recording surface is to be formed, and said magnetic tape has a thickness of 7 μm or less, wherein said magnetic tape further comprises a layer of a metal or an alloy located between said substrate and said resin layer, and a servo tracking pattern comprising depressions is formed in said layer of metal or an alloy.

* * * * *